US007581054B2

(12) United States Patent
Hagiwara et al.

(10) Patent No.: US 7,581,054 B2
(45) Date of Patent: Aug. 25, 2009

(54) DATA PROCESSING SYSTEM

(75) Inventors: Kesami Hagiwara, Tokyo (JP); Takeshi Kataoka, Tokyo (JP); Hisakazu Sato, Tokyo (JP); Shunichi Iwata, Tokyo (JP); Yoshikazu Kiyoshige, Tokyo (JP); Akihiko Tomita, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 147 days.

(21) Appl. No.: 11/779,189

(22) Filed: Jul. 17, 2007

(65) Prior Publication Data

US 2008/0022030 A1 Jan. 24, 2008

(30) Foreign Application Priority Data

Jul. 24, 2006 (JP) ............................ 2006-201036

(51) Int. Cl.
*G06F 13/14* (2006.01)
*G06F 15/167* (2006.01)

(52) U.S. Cl. ...................................... 710/305; 709/216

(58) Field of Classification Search .................. 710/22, 710/26, 27, 300, 305, 312; 709/213, 214, 709/216

See application file for complete search history.

(56) References Cited

U.S. PATENT DOCUMENTS 6,128,677 A * 10/2000 Miller et al. .................. 710/40

(Continued)

OTHER PUBLICATIONS

Jin Lee et al. "Orthogonalized Communication Architecture for MP-SoC with Global Bus" 2005 Proceedings of the 9th International Database Engineering & Application Symposium, pp. 541-545.

(Continued)

*Primary Examiner*—Khanh Dang
(74) *Attorney, Agent, or Firm*—Miles & Stockbridge P.C.

(57) ABSTRACT

In a multiprocessor, one of two local memories can be accessed at a high speed by one of the two processors and also accessed by the other processor. In a multiprocessor, first and second local memories are coupled to first and second processors via first and second local buses. First and second bus bridges are coupled to a system bus and the first and second local buses. First and second bus interface units are coupled to the system bus and the first and second local memories. A high-speed access is made from the first processor to the first local memory via the first local bus. The first local memory is also accessed from the first processor via the first local bus, the first bus bridge, the system bus, and the first and third ports of the second bus interface unit and from the second processor via the second local bus, the second bus bridge, the system bus, and the second and third ports of the first bus interface unit. A high-speed access is made from the second processor to the second local memory via the second local bus. The second local memory is also accessed from the second processor via the second local bus, the second bus bridge, the system bus, and the second and third ports of the first bus interface unit and from the first processor via the first local bus, the first bus bridge, the system bus, and the first and third ports of the second bus interface unit.

17 Claims, 8 Drawing Sheets

U.S. PATENT DOCUMENTS

| | | | | |
|---|---|---|---|---|
| 6,446,149 | B1 * | 9/2002 | Moriarty et al. | 710/110 |
| 6,742,072 | B1 * | 5/2004 | Prakash et al. | 710/305 |
| 7,062,587 | B2 * | 6/2006 | Zaidi et al. | 710/305 |
| 7,131,020 | B2 * | 10/2006 | Moll et al. | 713/375 |
| 7,340,546 | B2 * | 3/2008 | Moll et al. | 710/220 |
| 2004/0059818 | A1 * | 3/2004 | Snyder et al. | 709/226 |
| 2006/0036789 | A1 * | 2/2006 | Lee | 710/200 |
| 2008/0229006 | A1 * | 9/2008 | Nsame et al. | 711/104 |

OTHER PUBLICATIONS

Thomas E. Anderson "The Performance of Spin Lock Alternatives for Shared-Memory Multiprocessors", IEEE Transactions on Parallel and Distributed Systems, vol. 1, No. 1, Jan. 1990, pp. 6-16.

Chang Hee Pyoun et al. "The Efficient Bus Arbitration Scheme in Soc Environment", 2003 Proceedings of the 3rd IEEE International Workshop on System-on-Chip for Real-Time Applications, pp. 311-315.

* cited by examiner

FIG. 2

| | Address | CONT |
|---|---|---|
| | : | : |
| CPU1→LB102 →L-MEM101 | 0x01000000<br>:<br>0x01FFFFFF | L-MEM101<br>Local Bus Space<br>Non-Shared |
| CPU2→LB202 →L-MEM201 | 0x02000000<br>:<br>0x02FFFFFF | L-MEM201<br>Local Bus Space<br>Non-Shared |
| | : | : |
| CPU1, 2→SB105, 205 BIU 3,5→L-MEM101 | 0x11000000<br>:<br>0x11FFFFFF | L-MEM101<br>System Bus Space<br>Shared |
| CPU1, 2→SB105, 205 BIU 3,5→L-MEM201 | 0x12000000<br>:<br>0x12FFFFFF | L-MEM201<br>System Bus Space<br>Shared |
| | : | : |

FIG. 7

| | Address | CONT |
|---|---|---|
| | : | : |
| CPU1→LB102 →<br>BUI 3→L-MEM101 | 00x0000000<br>:<br>00xFFFFFFF | L-MEM101<br>Bank 1<br>Non-Shared |
| CPU2→LB202→<br>BUI 5→L-MEM201 | 01x 0000000<br>:<br>01xFFFFFFF | L-MEM201<br>Bank 2<br>Non-Shared |
| | : | : |
| CPU1 → SB205<br>BUI 3→L-MEM101<br>CPU2 → SB205<br>BUI 3→L-MEM101 | 10x 0000000<br>:<br>10xFFFFFFF | L-MEM101<br>Bank 3<br>Shared |
| CPU2 → SB105<br>BUI 5→L-MEM201<br>CPU1 → SB105<br>BUI 5→L-MEM201 | 11x 0000000<br>:<br>11xFFFFFFF | L-MEM201<br>Bank 4<br>Shared |
| | : | : |

DATA PROCESSING SYSTEM

CROSS-REFERENCE TO RELATED APPLICATIONS

The disclosure of Japanese patent Application No. 2006-201036 filed on Jul. 24, 2006 including the specification, drawings and abstract is incorporated herein by reference in its entirety.

BACKGROUND OF THE INVENTION

The present invention relates to a data processing system having a plurality of processors and, more particularly, to a technology which allows an easy access to a shared resource such as a shared memory used in common by the plurality of processors, and is useful in exclusively accessing the respective local memories of the processors.

Non-Patent Document 1 shown below discloses a multiprocessor architecture in which a plurality of processors having respective local memories are coupled to a global bus via bus bridges termed transactors. A global memory is coupled to the global bus. A central arbiter is coupled to the global bus and to the plurality of bus bridges. The central arbiter monitors a transaction on the global bus. When one of the multiple processors terminates a write transaction, the central arbiter requests the bus bridge of the next processor in the sequence of processes to generate a read transaction. After acquiring the request for the read transaction, the bus bridge interrupts the corresponding processor, acquires a local memory address, and stores data from the global memory in the local memory.

On the other hand, a spin lock method has been conventionally known as a method for exclusively accessing the shared memory of a multiprocessor. In the spin lock method, one of multiple processors determines from a lock variable whether or not the shared memory is usable before accessing the shared memory. When the shared memory is usable, the one of the multiple processors rewrites the lock variable from a usable state (e.g., a “0” level) to an in-use state (e.g., a “1” level) and exclusively accesses the shared memory. When the access to the shared memory is completed, the one of the multiple processors rewires the lock variable from the in-use state (e.g., the “1” level) to the usable state (e.g., the “0” level). The spin lock method is disclosed in, e.g., Non-Patent Document 2 shown below.

In a round robin system, unlike in the spin lock method, an execution time on a bus is divided into a plurality of even time slots and successively allocated to a plurality of bus masters by time-division multiplex scheduling. The round robin method is disclosed in, e.g., Non-Patent Document 3 shown below.

[Non-Patent Document 1] Jin Lee et al., “Orthogonalized Communication Architecture for MP-SOC with Global Bus”, 2005 Proceedings Fifth International Workshop on System-on-Chip for Real-Time-Applications, 20-24 Jul. 2005 PP. 541-545

[Non-Patent Document 2] THOMAS E. ANDERSON, “The performance of Spin Lock Alternatives for Shared-Memory Multiprocessors”, IEEE TRANSACTIONS ON PARALLEL AND DISTRIBUTED SYSTEMS, VOL. 1, NO. 1, JANUARY 1990, PP. 6-16

[Non-Patent Document 3] Chang Hee Pyoun et al., “THE EFFICIENT BUS ARBITRATION SCHEME IN SOC ENVIRONMENT”, 2003 Proceedings The 3rd International Workshop on System-on-Chip for Real-Time-Applications, 30 Jun.-2 Jul. 2003 PP. 311-315

SUMMARY OF THE INVENTION

As mentioned above, there has been known a data processing system in a multiprocessor architecture which comprises a plurality of processors to respond to the recent increase in performance in a multitask environment.

In the multiprocessor architecture, a process in one processor and a process in another processor can be executed in parallel provided that the two processes can be executed by using the respective register files of the two processors and the two processes are independent of each other without causing competition in using shared hardware resources such as an internal RAM, an external main memory, an input/output device, and a peripheral device to execute the two processes. However, when competition occurs in using the shared hardware resources, the two processes cannot be executed in parallel.

Prior to achieving the present invention, the present inventors have been engaged in the development of a microcontroller for performing a correlated process which uses the result of a process by one processor for a process by another processor in a multiprocessor architecture.

In the simplest method used in performing the correlated process between the two processors, the result of the process by the one processor is stored in a shared memory and then the other processor accesses the shared memory. However, compared with a local bus (CPU bus) to which a processor and a local memory are coupled, a system bus to which the shared memory is coupled is low in speed. Hence, the study conducted by the present inventors has proved that the access method described above is low in speed.

The present invention has been achieved based on the result of the study conducted by the present inventors prior to the present invention and an object of the present invention is to allow, when a correlated process is performed between two processors in a data processing system in a multiprocessor architecture, one of two local memories to be accessed at a high speed by one of the two processors and also accessed by the other processor.

The study conducted by the present inventors has also proved that, by thus allowing the one local memory to be also accessed by the other processor, not only the shared memory but also the local memory serve as shared hardware resources and, consequently, it becomes necessary to make an exclusive access to the local memory.

Therefore, another object of the present invention is to allow an exclusive access to be made to a local memory in a data processing system in a multiprocessor architecture.

In making an exclusive access to shared resources such as a local memory, a shared memory, and a peripheral device, it is the simplest method to store the lock variable for implementing the spin lock method in the shared memory coupled to a low-speed system bus. However, the study conducted by the present inventors has proved that the foregoing method for storing the lock variable is low in speed.

Therefore, still another object of the present invention is to allow high-speed storage and high-speed reading of a lock variable in a data processing system in a multiprocessor architecture.

The above and other objects and novel features of the present invention will become apparent from the description of the present specification and the accompanying drawings.

A brief description will be given to the outline of the representative aspects of the present invention disclosed in the present application.

Specifically, a data processing system according to one aspect of the present invention comprises: a first processor (1); a second processor (2); a first local memory (101); a second local memory (201); a first local bus (102); a second local bus (202); a first bus bridge (103); a second bus bridge (203); a system bus (SB) including a first system bus (105) and a second system bus (205); a first bus interface unit (3); and a second bus interface unit (5).

The first local memory (101) is coupled to the first processor (1) via the first local bus (102). The second local memory (201) is coupled to the second processor (2) via the second local bus (202). The first bus bridge (103) has one port coupled to the first local bus (102) and the other port coupled to the first system bus (105). The second bus bridge (203) has one port coupled to the second local bus (202) and the other port coupled to the second system bus (205).

The first bus interface unit (3) has a first port (P1) coupled to the first system bus (105), a second port (P2) coupled to the second system bus (205), and a third port (P3) coupled to the first local memory (101). The second bus interface unit (5) has a first port (P1) coupled to the first system bus (105), a second port (P2) coupled to the second system bus (205), and a third port (P3) coupled to the second local memory (201).

The first processor (1) supplies a first request signal (req1) for requesting an access to the second local memory (201) to the first port (P1) of the second bus interface unit (5) via the first local bus (102), the first bus bridge (103), and the first system bus (105). On receiving the first request signal (req1), the second bus interface unit (5) gives a first acknowledge signal (ack1) for permitting the access by the first processor (1) to the second local memory (201). In response to the first acknowledge signal (ack1), the first processor (1) accesses the second local memory (201) via the first local bus (102), the first bus bridge (103), the first system bus (105), and the first port (P1) and third port (P3) of the second bus interface unit (5).

The second processor (2) supplies a second request signal (req2) for requesting an access to the first local memory (101) to the second port (P2) of the first bus interface unit (3) via the second local bus (202), the second bus bridge (203), and the second system bus (205). On receiving the second request signal (req2), the first bus interface unit (3) gives a second acknowledge signal (ack2) for permitting the access by the second processor (2) to the first local memory (101). In response to the second acknowledge signal (ack2), the second processor (2) accesses the first local memory (101) via the second local bus (202), the second bus bridge (203), the second system bus (205), and the second port (P2) and third port (P3) of the first bus interface unit (3) (see FIG. 1).

When a correlated process is performed between two processors in a data processing system in a multiprocessor architecture, means according to the one aspect of the present invention allows one of two local memories to be accessed by one of the two processors at a high speed and also accessed by the other processor.

In the data processing system in a preferred embodiment according to the one aspect of the present invention, the first processor (1) supplies a first exclusive access request signal (keep1) for requesting an exclusive access to the second local memory (201) to the first port (P1) of the second bus interface unit (5) via the first local bus (102), the first bus bridge (103), and the first system bus (105). On receiving the first exclusive access request signal (keep1), the second bus interface unit (5) gives the first acknowledge signal (ack1) for permitting the access by the first processor (1) to the second local memory (201). In response to the first acknowledge signal (ack1), the first processor (1) exclusively accesses the second local memory (201) via the first local bus (102), the first bus bridge (103), the first system bus (105), and the first port (P1) and third port (P3) of the second bus interface unit (5). The second processor (2) supplies a second exclusive access request signal (keep2) for requesting an exclusive access to the first local memory (101) to the second port (P2) of the first bus interface unit (3) via the second local bus (202), the second bus bridge (203), and the second system bus (205). On receiving the second exclusive access request signal (keep2), the first bus interface unit (3) gives the second acknowledge signal (ack2) for permitting the access by the second processor (2) to the first local memory (101). In response to the second acknowledge signal (ack2), the second processor (2) exclusively accesses the first local memory (101) via the second local bus (202), the second bus bridge (203), the second system bus (205), and the second port (P2) and third port (P3) of the first bus interface unit (3) (see FIG. 1).

In a data processing system in a multiprocessor architecture, means in the preferred embodiment according to the one aspect of the present invention allows an exclusive access to a local memory.

In the data processing system in a more preferred embodiment according to the one aspect of the present invention, a first local variable (101_LV) for allowing the first processor (1) or the second processor (2) to exclusively access shared resources in accordance with a spin lock method is stored in the first local memory (101) and a second local variable (201_LV) for allowing the first processor (1) or the second processor (2) to exclusively access the shared resources in accordance with the spin lock method is stored in the second local memory (201). The first local variable (101_LV) in the first local memory (101) is exclusively accessed by either of the first processor (1) and the second processor (2) and the second local variable (201_LV) in the second local memory (201) is exclusively accessed by either of the first processor (1) and the second processor (2) (see FIG. 1).

Means in the more preferred embodiment according to the one aspect of the present invention allows high-speed storage and high-speed reading of a lock variable.

In a still more preferred embodiment, the data processing system according to the one aspect of the present invention further comprises: external interface units (4, 7) capable of being coupled to external devices (402, 702). Each of the external interface units (4, 7) is coupled to the first system bus (105) and the second system bus (205). Either of the first processor (1) and the second processor (2) exclusively accesses one of the external devices (402, 702) via the corresponding one of the external interface units (4, 7) by using either of the first local variable (101_LV) stored in the first local memory (101) and the second local variable (201_LV) stored in the second local memory (201) (see FIG. 1).

In the data processing system in a yet more preferred embodiment according to the one aspect of the present invention, the first local memory (101) includes a first unshared region which can be accessed only by the first processor (1) and a first shared region which can be accessed by each of the first processor (1) and the second processor (2) and the second local memory (201) includes a second unshared region which can be accessed only by the second processor (2) and a second shared region which can be accessed by each of the first processor (1) and the second processor (2) (see FIG. 2).

In the data processing system in a still more preferred embodiment according to the one aspect of the present invention, an access by the first processor (1) to the first unshared region of the first local memory (101) and an access by the second processor (2) to the second unshared region of the second local memory (201) can be executed in parallel (see FIG. 1).

In the data processing system in a yet more preferred embodiment according to the one aspect of the present invention, each of the first shared region of the first local memory (101) and the second shared region of the second local memory (201) operates as an internal shared memory of the data processing system (see FIG. 1).

In the data processing system in a still more preferred embodiment according to the one aspect of the present invention, the first unshared region of the first local memory (101), the first shared region of the first local memory (101), the second unshared region of the second local memory (201), and the second shared region of the second local memory (201) are specified by respective address signals from the first processor (1) and the second processor (2) (see FIG. 2).

A data processing system according to another aspect of the present invention comprises: a first processor (1); a second processor (2); a first local memory (101); a second local memory (201); a first local bus (102); a second local bus (202); a first bus bridge (103); a second bus bridge (203); a system bus (SB) including a first system bus (105) and a second system bus (205); a first bus interface unit (3); and a second bus interface unit (5).

The first local bus (102) is coupled to the first processor (1). The second local bus (202) is coupled to the second processor (2). The first bus bridge (103) is coupled between the first local bus (102) and each of the first system bus (105) and the second system bus (205). The second bus bridge (203) is coupled between the second local bus (202) and each of the first system bus (105) and the second system bus (205).

The first bus interface unit (3) has a first port (P1) coupled to the first local bus (102), a second port (P2) coupled to the second system bus (205), and a third port (P3) coupled to the first local memory (101). The second bus interface unit (5) has a first port (P1) coupled to the second local bus (202), a second port (P2) coupled to the first system bus (105), and a third port (P3) coupled to the second local memory (201).

The first processor (1) supplies a first request signal (req1) for requesting an access to the first port (P1) of the first bus interface unit (3) via the first local bus (102). On receiving the first request signal (req1), the first bus interface unit (3) gives a first acknowledge signal (ack1) for permitting the access by the first processor (1). In response to the first acknowledge signal (ack1), the first processor (1) accesses the first local memory (101) via the first local bus (102) and the first port (P1) and third port (P3) of the first bus interface unit (3).

The first processor (1) supplies the first request signal (req1) for requesting the access to the first port (P1) of the second bus interface unit (5) via the first local bus (102), the first bus bridge (103), and the first system bus (105). On receiving the first request signal (req1), the second bus interface unit (5) gives the first acknowledge signal (ack1) for permitting the access by the first processor (1). In response to the first acknowledge signal (ack1), the first processor (1) accesses the second local memory (201) via the first local bus (102), the first bus bridge (103), the first system bus (105), and the first port (P1) and third port (P3) of the second bus interface unit (5).

The second processor (2) supplies a second request signal (req2) for requesting an access to the second port (P2) of the second bus interface unit (5) via the second local bus (202). On receiving the second request signal (req2), the second bus interface unit (5) gives a second acknowledge signal (ack2) for permitting the access by the second processor (2). In response to the second acknowledge signal (ack2), the second processor (2) accesses the second local memory (201) via the second local bus (202) and the second port (P2) and third port (P3) of the second bus interface unit (5).

The second processor (2) supplies the second request signal (req2) for requesting the access to the second port (P2) of the first bus interface unit (3) via the second local bus (202), the second bus bridge (203), and the second system bus (205). On receiving the second request signal (req2), the first bus interface unit (3) gives the second acknowledge signal (ack2) for permitting the access by the second processor (2). In response to the second acknowledge signal (ack2), the second processor (2) accesses the first local memory (101) via the second local bus (202), the second bus bridge (203), the second system bus (205), and the second port (P2) and third port (P3) of the first bus interface unit (3) (see FIG. 6).

When a correlated process is performed between two processors in a data processing system in a multiprocessor architecture, means according to the other aspect of the present invention allows one of two local memories to be accessed by one of the two processors at a high speed and also accessed by the other processor.

In the data processing system in a preferred embodiment according to the other aspect of the present invention, the first processor (1) supplies a first exclusive access request signal (keep1) for requesting an exclusive access to the second local memory (201) to the first port (P1) of the second bus interface unit (5) via the first local bus (102), the first bus bridge (103), and the first system bus (105). On receiving the first exclusive access request signal (keep1), the second bus interface unit (5) gives the first acknowledge signal (ack1) for permitting the access by the first processor (1) to the second local memory (201). In response to the first acknowledge signal (ack1), the first processor (1) exclusively accesses the second local memory (201) via the first local bus (102), the first bus bridge (103), the first system bus (105), and the first port (P1) and third port (P3) of the second bus interface unit (5). The second processor (2) supplies a second exclusive access request signal (keep2) for requesting an exclusive access to the first local memory (101) to the second port (P2) of the first bus interface unit (3) via the second local bus (202), the second bus bridge (203), and the second system bus (205). On receiving the second exclusive access request signal (keep2), the first bus interface unit (3) gives the second acknowledge signal (ack2) for permitting the access by the second processor (2) to the first local memory (101). In response to the second acknowledge signal (ack2), the second processor (2) exclusively accesses the first local memory (101) via the second local bus (202), the second bus bridge (203), the second system bus (205), and the second port (P2) and third port (P3) of the first bus interface unit (3) (see FIG. 6).

In a data processing system in a multiprocessor architecture, means in the preferred embodiment according to the other aspect of the present invention allows an exclusive access to a local memory.

In the data processing system in a more preferred embodiment according to the other aspect of the present invention, a first local variable (101_LV) for allowing the first processor (1) or the second processor (2) to exclusively access shared resources in accordance with a spin lock method is stored in the first local memory (101) and a second local variable (201_LV) for allowing the first processor (1) or the second processor (2) to exclusively access the shared resources in accordance with the spin lock method is stored in the second local memory (201). The first local variable (101_LV) in the first local memory (101) is exclusively accessed by either of the first processor (1) and the second processor (2) and the second local variable (201_LV) in the second local memory (201) is exclusively accessed by either of the first processor (1) and the second processor (2) (see FIG. 6).

Means in the more preferred embodiment according to the other aspect of the present invention allows high-speed storage and high-speed reading of a lock variable.

In a still more preferred embodiment, the data processing system according to the other aspect of the present invention further comprises: external interface (4, 7) units capable of being coupled to external devices (402, 702). Each of the external interface units (4, 7) is coupled to the first system bus (105) and the second system bus (205). Either of the first processor (1) and the second processor (2) exclusively accesses one of the external devices (402, 702) via the corresponding one of the external interface units (4, 7) by using either of the first local variable (101_LV) stored in the first local memory (101) and the second local variable (201_LV) stored in the second local memory (201) (see FIG. 6).

In the data processing system in a yet more preferred embodiment according to the other aspect of the present invention, the first local memory (101) includes a first bank (Bank1) and a second bank (Bank3) and the second local memory (201) includes a third bank (Bank2) and a fourth bank (Bank4).

The first bus interface unit (3) has the first port (P1) coupled to the first local bus (102), the second port (P2) coupled to the second system bus (205), the third port (P3) coupled to the first bank (Bank1) of the first local memory (101), and a fourth port (P4) coupled to the second bank (Bank3) of the first local memory (101). The second bus interface unit (5) has the first port (P1) coupled to the first system bus (105), the second port (P2) coupled to the second local bus (202), the third port (P3) coupled to the third bank (Bank2) of the second local memory (201), and a fourth port (P4) coupled to the fourth bank (Bank4) of the second local memory (201).

The first processor (1) supplies the first request signal (req1) for requesting the access to the first port (P1) of the first bus interface unit (3) via the first local bus (102). On receiving the first request signal (req1), the first bus interface unit (3) gives the first acknowledge signal (ack1) for permitting the access by the first processor (1). In response to the first acknowledge signal (ack1), the first processor (1) accesses the first bank (Bank1) of the first local memory (101) via the first local bus (102) and the first port (P1) and third port (P3) of the first bus interface unit (3).

The first processor (1) supplies the first request signal (req1) for requesting the access to the second port (P2) of the first bus interface unit (3) via the first local bus (102), the first bus bridge (103), and the second system bus (205). On receiving the first request signal (req1), the first bus interface unit (3) gives the first acknowledge signal (ack1) for permitting the access by the first processor (1). In response to the first acknowledge signal (ack1), the first processor (1) accesses the second bank (Bank3) of the first local memory (101) via the first local bus (102), the first bus bridge (103), the second system bus (205), and the second port (P2) and fourth port (P4) of the first bus interface unit (3).

The first processor (1) supplies the first request signal (req1) for requesting the access to the first port (P1) of the second bus interface unit (5) via the first local bus (102), the first bus bridge (103), and the first system bus (105). On receiving the first request signal (req1), the second bus interface unit (5) gives the first acknowledge signal (ack1) for permitting the access by the first processor (1). In response to the first acknowledge signal (ack1), the first processor (1) accesses the fourth bank (Bank4) of the second local memory (201) via the first local bus (102), the first bus bridge (103), the first system bus (105), and the first port (P1) and fourth port (P4) of the second bus interface unit (5).

The second processor (2) supplies the second request signal (req2) for requesting the access to the second port (P2) of the second bus interface unit (5) via the second local bus (202). On receiving the second request signal (req2), the second bus interface unit (5) gives the second acknowledge signal (ack2) for permitting the access by the second processor (2). In response to the second acknowledge signal (ack2), the second processor (2) accesses the third bank (Bank2) of the second local memory (201) via the second local bus (202) and the first port (P1) and third port (P3) of the second bus interface unit (5).

The second processor (2) supplies the second request signal (req2) for requesting the access to the second port (P2) of the first bus interface unit (3) via the second local bus (202), the second bus bridge (203), and the second system bus (205). On receiving the second request signal (req2), the first bus interface unit (3) gives the second acknowledge signal (ack2) for permitting the access by the second processor (2). In response to the second acknowledge signal (ack2), the second processor (2) accesses the second bank (Bank3) of the first local memory (101) via the second local bus (202), the second bus bridge (203), the second system bus (205), and the second port (P2) and fourth port (P4) of the first bus interface unit (3).

The second processor (2) supplies the second request signal (req2) for requesting the access to the first port (P1) of the second bus interface unit (5) via the second local bus (202), the second bus bridge (203), and the first system bus (105). On receiving the second request signal (req2), the second bus interface unit (5) gives the second acknowledge signal (ack2) for permitting the access by the second processor (2). In response to the second acknowledge signal (ack2), the second processor (2) accesses the fourth bank (Bank4) of the second local memory (201) via the second local bus (202), the second bus bridge (203), the first system bus (105), and the first port (P1) and fourth port (P4) of the second bus interface unit (5) (see FIG. 6).

In the data processing system in a still more preferred embodiment according to the other aspect of the present invention, the first local memory (101) includes a first unshared region (Bank1) which can be accessed only by the first processor (1) and a first shared region (Bank3) which can be accessed by each of the first processor (1) and the second processor (2) and the second local memory (201) includes a second unshared region (Bank2) which can be accessed only by the second processor (2) and a second shared region (Bank4) which can be accessed by each of the first processor (1) and the second processor (2) (see FIG. 7).

In the data processing system in a yet more preferred embodiment according to the other aspect of the present invention, an access by the first processor (1) to the first unshared region (Bank1) of the first local memory (101) and an access by the second processor (2) to the second unshared region (Bank2) of the second local memory (201) can be executed in parallel (see FIG. 6).

In the data processing system in a still more preferred embodiment according to the other aspect of the present invention, each of the first shared region (Bank3) of the first local memory (101) and the second shared region (Bank4) of the second local memory (201) operates as an internal shared memory of the data processing system (see FIG. 6).

In the data processing system in a yet more preferred embodiment according to the other aspect of the present invention, the first unshared region (Bank1) of the first local memory (101), the first shared region (Bank3) of the first local memory (101), the second unshared region (Bank2) of the second local memory (201), and the second shared region (Bank4) of the second local memory (201) are specified by respective address signals from the first processor (1) and the second processor (2) (see FIG. 7).

The following is the brief description of effects achievable by the representative aspects of the invention disclosed in the present application.

That is, the present invention allows, when a correlated process is performed between two processors in a data processing system in a multiprocessor architecture, one of two local memories to be accessed at a high speed by one of the two processors and also accessed by the other processor.

In addition, the present invention also allows an excessive access to a local memory in a data processing system in a multiprocessor architecture.

The present invention further allows high-speed storage and high-speed reading of a lock variable.

BRIEF DESCRIPTION OF THE DRAWINGS

FIG. 2 is a view showing address allocation in each of the unshared regions and shared regions of a first local memory and a second local memory in the data processing system in a multiprocessor architecture according to the embodiment shown in FIG. 1;

FIG. 7 is a view showing an example of bank division in each of a first local memory and a second local memory in the data processing system in a multiprocessor architecture of FIG. 6;

DESCRIPTION OF THE PREFERRED EMBODIMENTS

<Structure of Multi-CPU/Core Data Processing System>

Figure 1:
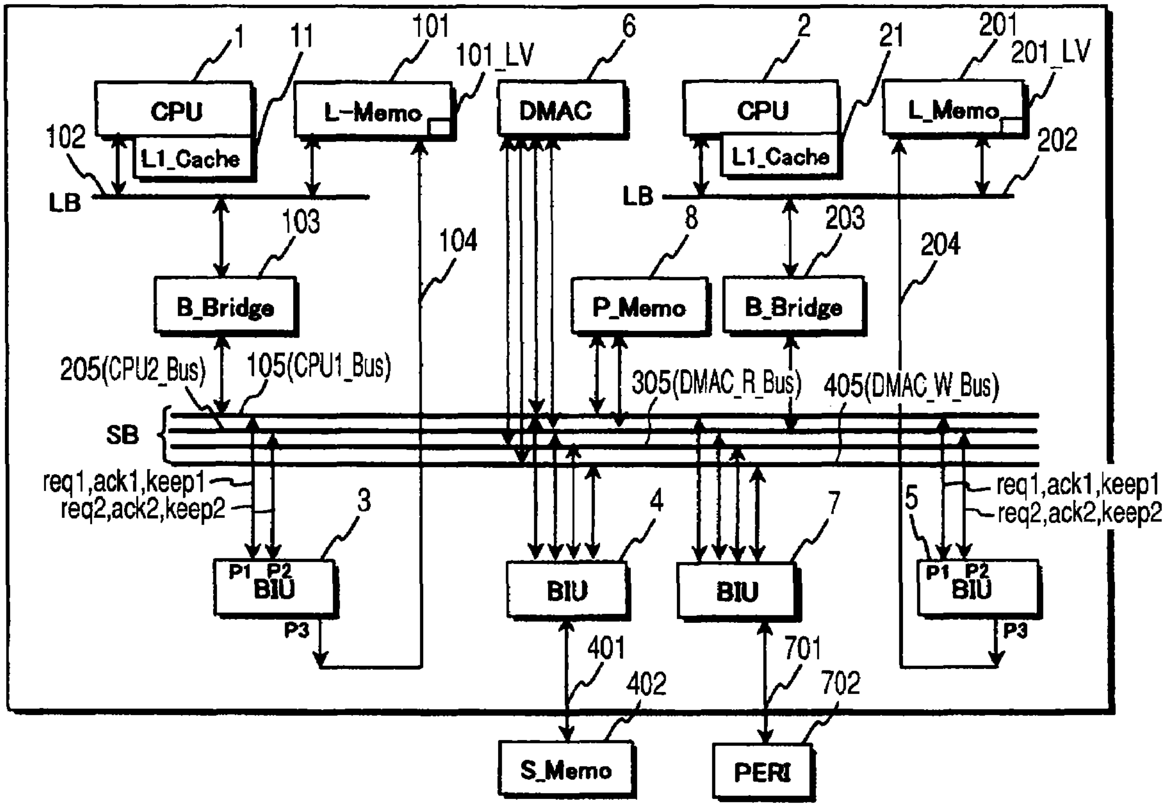
FIG. 1 is a view showing a data processing system in a multiprocessor architecture according to an embodiment of the present invention.

FIG. 1 is a view showing a data processing system in a multiprocessor architecture according to an embodiment of the present invention.

A data processor chip indicated by the large rectangle comprises: a first processor 1; a second processor 2; a first local memory 101; a second local memory 201; a first local bus 102; a second local bus 202; a first bus bridge 103; a second bus bridge 203; a system bus SB including a first system bus 105 and a second system bus 205; a first bus interface unit 3; and a second bus interface unit 5.

The first local memory 101 is coupled to the first processor 1 via the first local bus 102. The second local memory 201 is coupled to the second processor 2 via the second local bus 202. The first bus bridge 103 has one port coupled to the first local bus 102 and the other port coupled to the first system bus 105 of the system bus SB. The second bus bridge 203 has one port coupled to the second local bus 202 and the other port coupled to the second system bus 205 of the system bus SB.

The first bus interface unit 3 has a first port P1 coupled to the first system bus 105, a second port P2 coupled to the second system bus 205, and a third port P3 coupled to the first local memory 101. The second bus interface unit 5 has a first port P1 coupled to the first system bus 105, a second port P2 coupled to the second system bus 205, and a third port P3 coupled to the second local memory 201.

A program memory 8 composed of a nonvolatile memory such as, e.g., a ROM or a flash memory is coupled to each of the first system bus 105 and second system bus 205 of the system bus SB. Programs to be executed by the first processor 1 and the second processor 2 are stored in the program memory 8. An instruction according to the program read by the first processor 1 from the program memory 8 is stored in the first cache memory 11 on the level 1 of the first processor 1. An instruction according to the program read by the second processor 2 from the program memory 8 is stored in the second cache memory 21 on the level 1 of the second processor 2. A direct memory access controller (DMAC) 6 is coupled to the system bus SB. The DMAC 6 is coupled to each of the first system bus 105 and second system bus 205 of the system bus SB, a DMAC read bus 305, and a DMAC write bus 405. A third bus interface unit 4 and a fourth bus interface unit 7 are coupled to the system bus SB. A shared memory 402 such as an external synchronous DRAM can be coupled to the third bus interface unit 4 via an external bus 401. An external peripheral device 702 can be coupled to the fourth bus interface unit 7 via an external bus 701.

As a result, in the data processing system in a multiprocessor architecture shown in FIG. 1, the shared memory 402 coupled to the third bus interface unit 4 and the external peripheral device 702 coupled to the fourth bus interface unit 7 serve as shared hardware resources for the first processor 1 and the second processor 2, while a storage region in a part of the first local memory 101 and a storage region in a part of the second local memory 201 also serve as shared resources, as will be described later in detail.

In the data processing system in a multiprocessor architecture shown in FIG. 1, a command and an address from the first processor 1 or the second processor 2 are transferred to any of the first local bus 102, the second local bus 202, and the first system bus 105 and second system bus 205 of the system bus SB, while data between the first processor 1 or the second processor 2 and the first local memory 101, the second local memory 201, or the shared memory 402 can be transferred bidirectionally therebetween. In addition, an address of the source of a DMA transfer by the DMAC 6 is transferred to the DMAC read bus 305 of the system bus SB and data from the DMA transfer source is also transferred thereto, while an address of the destination of the DMA transfer by the DMAC 6 is transferred to the DMAC write bus 405 of the system bus SB and data to the DMA transfer destination is also transferred thereto.

The first cache memory 11 and the second cache memory 21, each on the level 1, operate either in a copy back method or in a write through method. For example, when mode setting is not particularly performed in system initialization such as a power-on reset for a data processor chip, the first cache memory 11 and the second cache memory 21, each on the level 1, operate in the copy back method specified by default. Accordingly, in the copy back method, unshared data from the first processor 1 and the second processor 2 is written only in the first cache memory 11 and the second cache memory 21, each on the level 1, in the unshared region of the first local memory 101, and in the unshared region of the second local memory 201, and is not written in the shared memory 402, in the shared region of the first local memory 101, or in the shared region of the second local memory 201. On the other hand, shared data from the first processor 1 and the second processor 2 is written only in the first cache memory 11 and the second cache memory 21, each on the level 1, in the shared region of the first local memory 101, and in the shared region of the second local memory 201, and is not written in the shared memory 402. When a mode in the write through method is specified in the system initialization of the data processor chip, by contrast, the first cache memory 11 and the second cache memory 21, each on the level 1, operate in the write through method. Accordingly, in the write through method, the unshared or shared data from the first processor 1 and the second processor 2 is written in the first cache memory 11 and the second cache memory 21, each on the level 1, and then also written in the shared memory 402, in the first local memory 101, and in the second local memory 201.

<Function of Processors>

The first processor 1, and the second processor 2 read instructions according to the programs from the program memory 8 and execute processes indicated by the instructions. The processes include an unshared process (exclusive process) which uses the unshared resources of the multiprocessor using only arithmetic operation elements and register files in the first processor 1, arithmetic operation elements and register files in the second processor 2, the unshared region (region exclusively used by the first processor 1) of the first local memory 101, and the unshared region (region exclusively used by the second processor 2) of the second local memory 201. For the unshared process by the first processor 1 or the second processor 2, the first local bus 102 or the second local bus 202 is used. Next, the processes include a shared process which uses the shared resources of the multiprocessor, such as reading data from the shared region of the first local memory 101 or the second local memory 201 or from the shared memory 402, writing data in the shared region of the first local memory 101 or the second local memory 201 or in the shared memory 402, transferring data from the shared region of the first local memory 101 or the second local memory 201 or from the shared memory 402 to the external peripheral device 702, or transferring data from the external peripheral device 702 to the shared region of the first local memory 101 or the second local memory 201 or to the shared memory 402. For the shared process by the first processor 1 or the second processor 2, not only the first local bus 101 and the second local bus 202 but also shared resources such as the first bus bridge 103, the second bus bridge 203, the first system bus 105, the second system bus 205, the bus interface units 3, 4, 5, and 7, and the DMAC 6 are used.

In using the shared resources of the multiprocessor such as the shared regions of the first local memory 101 and the second local memory 201, the shared memory 402, and the DMAC 6 for the shared process, the first processor 1 issues a first request signal req1 before using the shared resources.

Also, in using the shared resources of the multiprocessor such as the shared regions of the first local memory 101 and the second local memory 201, the shared memory 402, and the direct memory access controller 6 for the shared process, the second processor 2 issues a second request signal req2 before using the shared resources, similarly to the first processor 1.

In using the shared resources of the multiprocessor, when the first processor 1 exclusively accesses, e.g., a lock variable for a spin lock method or the like, the first processor 1 further issues a first exclusive access request signal keep1 prior to the exclusive access.

Also, in using the shared resources of the multiprocessor, when the second processor 2 exclusively accesses, e.g., a lock variable for a spin lock method or the like, the second processor 2 further issues a second exclusive access request signal keep2 prior to the exclusive access, similarly to the first processor 1.

<Local Memory>

The first local memory 101 and the second local memory 201 have the unshared regions and the shared regions, as described above.

FIG. 2 is a view showing address allocation (region partition) in each of the unshared regions and shared regions of the first local memory 101 and the second local memory 201 in the data processing system in a multiprocessor architecture according the embodiment of the present invention shown in FIG. 1.

As shown in the drawing, an address region having processor addresses from a start address "0x01000000" to an end address "0x01FFFFFF" is the first unshared region of the first local memory 101 used for the unshared process in which the first local memory 101 is exclusively accessed only by the first processor 1 via the first local bus 102. Next, an address region having processor addresses from a start address "0x02000000" to an end address "0x02FFFFFF" is the second unshared region of the second local memory 201 used for the unshared process in which the second local memory 201 is exclusively accessed only by the second processor 2 via the second local bus 202. In either of the access from the first processor 1 to the first unshared region of the first local memory 101 via the first local bus 102 and the access from the second processor 2 to the second unshared region of the second local memory 201 via the second local bus 202, the first system bus 105 or second system bus 205 of the system bus SB and the first bus interface unit 3 or the second bus interface unit 5 are not used so that the effect of enabling a high-speed access is achieved. In addition, because the access from the first processor 1 to the first unshared region of the first local memory 101 via the first local bus 102 and the access from the second processor 2 to the second unshared region of the second local memory 201 via the second local bus 202 are independent of each other, the effect of enabling parallel execution is also achieved.

Next, an address region having processor addresses from a start address "0x11000000" to an end address "0x11FFFFFF" is the first shared region of the first local memory 101 used for the shared process in which the first local memory 101 is accessed in shared relation by each of the first processor 1 and the second processor 2 via the first bus bridge 103 or the second bus bridge 203, the first system bus 105 or second system bus 205 of the system bus SB, and the first bus interface unit 3. Finally, an address region having processor addresses from a start address "0x12000000" to an end address "0x12FFFFFF" is the second shared region of the second local memory 201 used for the shared process in which the second local memory 201 is accessed in shared relation by each of the first processor 1 and the second processor 2 via the first bus bridge 103 or the second bus bridge

203, the first system bus 105 or second system bus 205 of the system bus SB, and the second bus interface unit 5.

Therefore, compared with a low-speed correlated process between the first processor 1 and the second processor 2 via the shared memory 402 such as an external synchronous DRAM coupled to the third bus interface unit 4, the effect of enabling a high-speed correlated process between the first processor 1 and the second processor 2 is achieved by the coupling between the first bus interface unit 3 and the first local memory 101 including the first shared region, the coupling between the second bus interface unit 5 and the second local memory 201 including the second shared region, and the interconnection among the first processor 1, the second processor 2, the first bus interface unit 3, and the second bus interface unit 5 provided by the system bus SB. In addition, the effect of enabling each of the first shared region of the first local memory 101 and the second shared region of the second local memory 201 to operate as the internal shared memory of the data processor chip is further achieved.

<Bus Bridges>

When the first processor 1 issues the first request signal req1 onto the first local bus 102 in using the shared resources of the multiprocessor, the first bus bridge 103 transfers information such as the first request signal req1, an instruction, data, and an address on the first local bus 102 to the first system bus 105 of the system bus SB. Also, when the second processor 2 issues the second request signal req2 onto the second local bus 202 in using the shared resources of the multiprocessor, the second bus bridge 203 transfers information such as the second request signal req2, an instruction, data, and an address on the second local bus 202 to the second system bus 205 of the system bus SB, similarly to the first bus bridge 103. When the first request signal req1 and the second request signal req2 are not issued, the information is not transferred to either the first system bus 105 or second system bus 205 of the system bus SB and, consequently, unnecessary bus traffic on the system bus SB can be reduced.

<Bus Interface Units>

<First Bus Interface Unit 3>

The first bus interface unit 3 is activated by the transfer of the first request signal req1 or the second request signal req2 to the first system bus 105 or second system bus 205 of the system bus SB via the first bus bridge 103 or the second bus bridge 203.

When only the first request signal req1 is transferred, the first bus interface unit 3 receives the first request signal req1 and issues a first acknowledge signal ack1 for permitting an access by the first processor 1 to the first local memory 101. In response to the first acknowledge signal ack1, the first processor 1 accesses the first shared region, which is the address region in the first local memory 101 from the start address "0x11000000" to the end address "0x11FFFFFF" via the first local bus 102, the first bus bridge 103, the first system bus 105 of the system bus SB, and the first port P1 and third port P3 of the first bus interface unit 3.

When only the second request signal req2 is transferred, the first bus interface unit 3 receives the second request signal req2 and issues a second acknowledge signal ack2 for permitting an access by the second processor 2 to the first local memory 101. In response to the second acknowledge signal ack2, the second processor 2 accesses the first shared region, which is the address region in the first local memory 101 from the start address "0x11000000", to the end address "0x11FFFFFF" via the second local bus 202, the second bus bridge 203, the second system bus 205 of the system bus SB, and the second port P2 and third port P3 of the first bus interface unit 3.

It is assumed that the first processor 1 and the second processor 2 have simultaneously issued the first request signal req1 and the second request signal req2 without issuing the first exclusive access request signal keep1 and the second exclusive access request signal keep2. Then, the first bus interface unit 3 selects one of the first request signal req1 and the second request signal req2 by, e.g., time division multiplex scheduling in a round robin method. When the selected one is the first request signal req1, the first bus interface unit 3 issues the first acknowledge signal ack1 to the first processor 1. Then, in response to the first acknowledge signal ack1, the first processor 1 accesses the first shared region, which is the address region in the first local memory 101 from the start address "0x11000000" to the end address "0x11FFFFFF" via the first local bus 102, the first bus bridge 103, the first system bus 105 of the system bus SB, and the first port P1 and third port P3 of the first bus interface unit 3.

It is assumed that the first processor 1 and the second processor 2 have simultaneously issued the first request signal req1 and the second request signal req2, and have also simultaneously issued the first exclusive access request signal keep1 and the second exclusive access request signal keep2. Then, the first bus interface unit 3 selects one of the first request signal req1 and the second request signal req2 by, e.g., time division multiplex scheduling in the round robin method. When the selected one is the first request signal req1, the first bus interface unit 3 issues the first acknowledge signal ack1 to the first processor 1. Then, in response to the first acknowledge signal ack1, the first processor 1 accesses the first shared region, which is the address region in the first local memory 101 from the start address "0x11000000" to the end address "0x11FFFFFF" via the first local bus 102, the first bus bridge 103, the first system bus 105 of the system bus SB, and the first port P1 and third port P3 of the first bus interface unit 3. Thereafter, the first bus interface unit 3 issues the first acknowledge signal ack1 to the first processor 1 by giving a higher priority to the first request signal req1 than to the second request signal req2 till the first processor 1 no more issues the first exclusive access request signal keep1.

Additionally, by using the first bus interface unit 3, an access can be made from the second processor 2 to the second shared region of the second local memory 201 via the second local bus 202, the second bus bridge 203, the second system bus 205 of the system bus SB, and the second port P2 and third port P3 of the first bus interface unit 3 in parallel with an access from the first processor 1 to the first unshared region of the first local memory 101 via the first local bus 102.

By using the first bus interface unit 3 and the second bus interface unit 5, an access can also be made from the second processor 2 to the second shared region of the second local memory 201 via the second local bus 202, the second bus bridge 203, the second system bus 205 of the system bus SB, and the second port P2 and third port P3 of the second bus interface unit 5 in parallel with an access from the first processor 1 to the first shared region of the first local memory 101 via the first local bus 102, the first bus bridge 103, the first system bus 105 of the system bus SB, and the first port P1 and third port P3 of the first bus interface unit 3.

<Second Bus Interface Unit 5>

By the transfer of the first request signal req1 or the second request signal req2 to the first system bus 105 or second system bus 205 of the system bus SB via the first bus bridge 103 or the second bus bridge 203, the second bus interface unit 5 is activated in the same manner as the first bus interface unit 3.

When only the second request signal req2 is transferred, the second bus interface unit 5 receives the second request signal req2 and issues the second acknowledge signal ack2 for permitting an access by the second processor 2 to the second local memory 201. In response to the second acknowledge signal ack2, the second processor 2 accesses the second shared region, which is the address region in the second local memory 201 from the start address "0x12000000" to the end address "0x12FFFFFF" via the second local bus 202, the second bus bridge 203, the second system bus 205 of the system bus SB, and the second port P2 and third port P3 of the second bus interface unit 5.

When only the first request signal req1 is transferred, the second bus interface unit 5 receives the first request signal req1 and issues the first acknowledge signal ack1 for permitting an access by the first processor 1 to the second local memory 201. In response to the first acknowledge signal ack1, the first processor 1 accesses the second shared region, which is the address region in the second local memory 201 from the start address "0x12000000" to the end address "0x12FFFFFF" via the first local bus 102, the first bus bridge 103, the first system bus 105 of the system bus SB, and the first port P1 and third port P3 of the second bus interface unit 5.

It is assumed that the first processor 1 and the second processor 2 have simultaneously issued the first request signal req1 and the second request signal req2 without issuing the first exclusive access request signal keep1 and the second exclusive access request signal keep2. Then, the second bus interface unit 5 selects one of the first request signal req1 and the second request signal req2 by, e.g., time division multiplex scheduling in the round robin method. When the selected one is the second request signal req2, the second bus interface unit 5 issues the second acknowledge signal ack2 to the second processor 2. Then, in response to the second acknowledge signal ack2, the second processor 2 accesses the second shared region, which is the address region in the second local memory 201 from the start address "0x12000000" to the end address "0x12FFFFFF" via the second local bus 202, the second bus bridge 203, the second system bus 205 of the system bus SB, and the second port P2 and third port P3 of the second bus interface unit 5.

It is assumed that the first processor 1 and the second processor 2 have simultaneously issued the first request signal req1 and the second request signal req2, and have also simultaneously issued the first exclusive access request signal keep1 and the second exclusive access request signal keep2. Then, the second bus interface unit 5 selects one of the first request signal req1 and the second request signal req2 by, e.g., time division multiplex scheduling in the round robin method. When the selected one is the second request signal req2, the second bus interface unit 5 issues the second acknowledge signal ack2 to the second processor 2. Then, in response to the second acknowledge signal ack2, the second processor 2 accesses the second shared region, which is the address region in the second local memory 201 from the start address "0x12000000" to the end address "0x12FFFFFF" via the second local bus 202, the second bus bridge 203, the second system bus 205 of the system bus SB, and the second port P2 and third port P3 of the second bus interface unit 5. Thereafter, the second bus interface unit 5 issues the second acknowledge signal ack2 to the second processor 2 by giving a higher priority to the second request signal req2 than to the first request signal req1 till the second processor 2 no more issues the second exclusive access request signal keep2.

Additionally, by using the second bus interface unit 5, an access can be made from the first processor 1 to the first shared region of the second local memory 201 via the first local bus 102, the first bus bridge 103, the first system bus 105 of the system bus SB, and the first port P1 and third port P3 of the second bus interface unit 5 in parallel with an access from the second processor 2 to the second unshared region of the second local memory 201 via the second local bus 202.

<Internal Structure of Bus Interface Unit>

Figure 3:
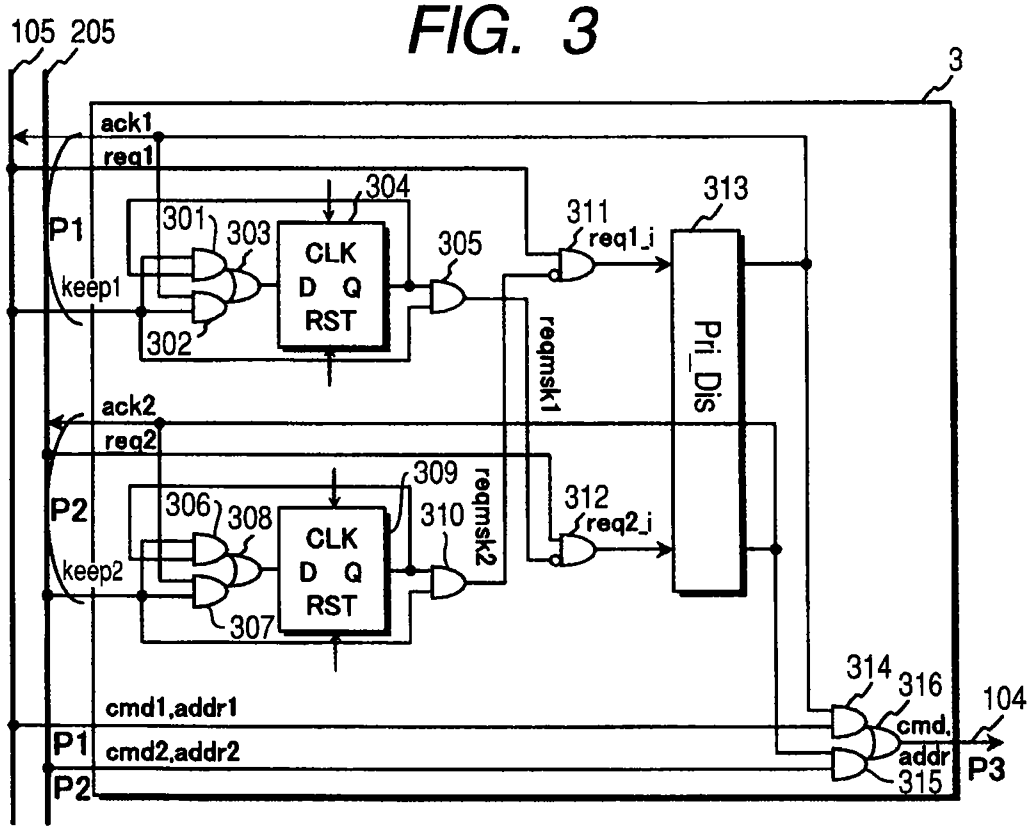
FIG. 3 is a view showing an internal structure of each of a first bus interface unit and a second bus interface unit in the data processor chip of FIG. 1.

FIG. 3 is a view showing an internal structure of each of the first bus interface unit 3 and the second bus interface unit 5 in the data processor chip of FIG. 1.

Although the drawing shows the internal structure of the first bus interface unit 3, the second bus interface unit 5 is also constructed in the same manner as the first bus interface unit 3. The first request signal req1 on the first system bus 105 is supplied to one input of an AND circuit 311, while a second request mask signal reqmsk2 from an AND circuit 310 is supplied to the other inversion input of the AND circuit 311. A first request output signal req1_i from the AND circuit 311 is supplied to one input terminal of a priority determination circuit 313. The second request signal req2 on the second system bus 205 is supplied to one input of an AND circuit 312, while a first request mask signal reqmsk1 from an AND circuit 305 is supplied to the other inversion input of the AND circuit 312. A second request output signal req2_i from the AND circuit 312 is supplied to the other input terminal of the priority determination circuit 313. The first exclusive access request signal keep1 on the first system bus 105 is supplied to a data input D of a first data latch circuit 304 via AND circuits 301 and 302 and an OR circuit 303. A data output Q of the first data latch circuit 304 is supplied as a first request mask signal reqmsk1 to the other inversion input of the AND circuit 312 via the AND circuit 305. The second exclusive access request signal keep2 on the second system bus 205 is supplied to a data input D of a second data latch circuit 309 via AND circuits 306 and 307 and an OR circuit 308. A data output Q of the second data latch circuit 309 is supplied as the second request mask signal reqmsk2 to the other inversion input of the AND circuit 311 via the AND circuit 310. The first acknowledge signal ack1 from the priority determination circuit 313 is supplied to the data input D of the first data latch circuit 304 via the AND circuit 302 and the OR circuit 303. The second acknowledge signal ack2 from the priority determination unit 313 is supplied to the data input D of the second data latch circuit 309 via the AND circuit 307 and the OR circuit 308.

<Bus Arbitration by Bus Interface Unit>

Figure 5:
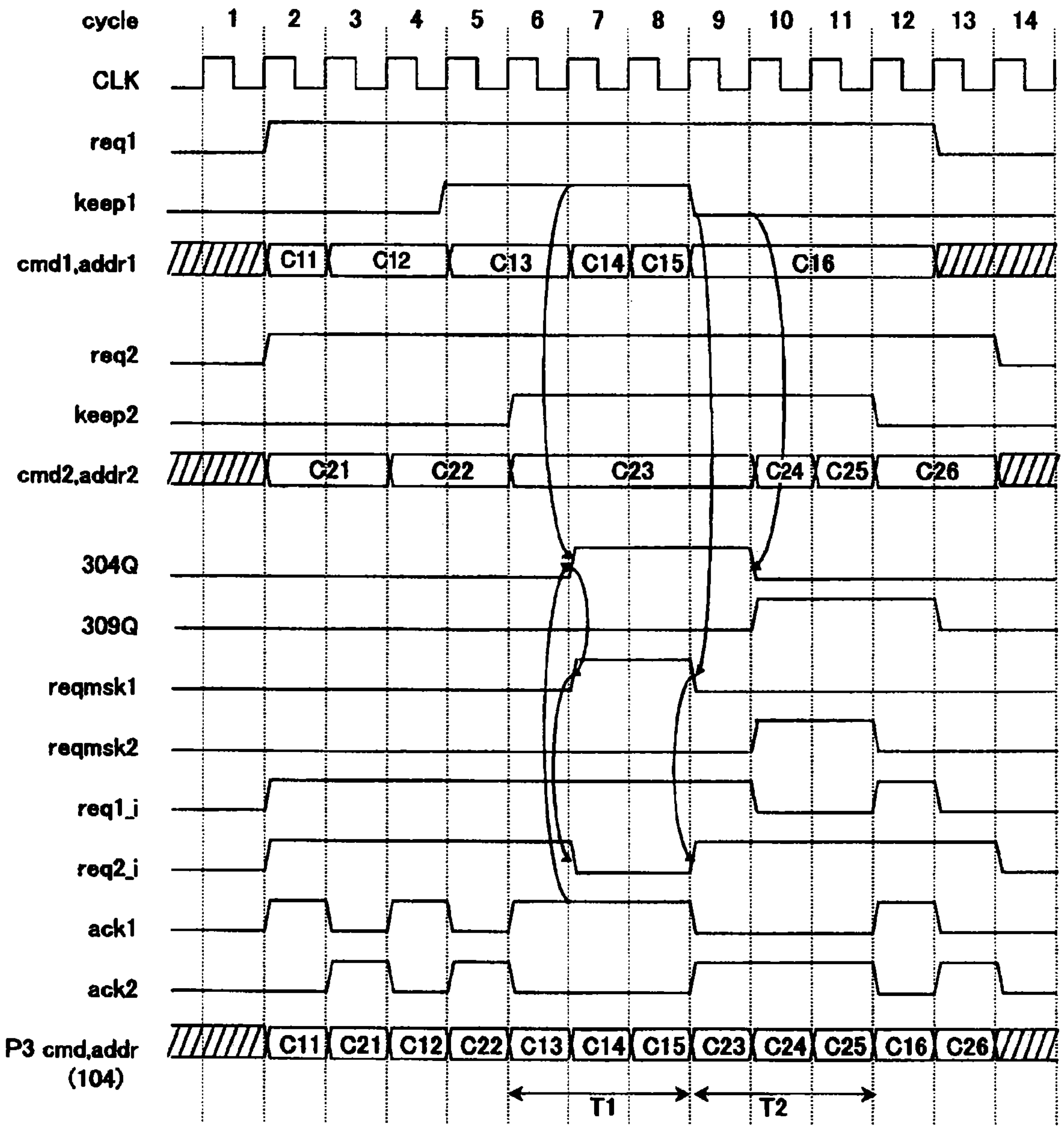
FIG. 5 is a waveform chart for each of the internal portions of the first bus interface unit, which is for illustrating the operation of each of the first bus interface unit and the second bus interface unit shown in FIG. 3.

FIG. 5 is a waveform chart for each of the internal portions of the first bus interface unit, which is for illustrating the operation of each of the first bus interface unit 3 shown in FIG. 3 and the second bus interface unit 5.

When each of the first request signal req1 on the first system bus 105 and the second request signal req2 on the second system bus 205 is asserted to a level "1" in the cycle 2 of FIG. 5, each of the first request output signal req1_i from the AND circuit 311 and the second request output signal req2_i from the AND circuit 312 is asserted to the level "1". The first request output signal req1_i on the level "1" from the AND circuit 311 and the second request output signal req2_i on the level "1" from the AND circuit 312 are supplied to the two inputs of the priority determination circuit 313. In accordance with the round robin method, in each of the cycles 2 and 4 of FIG. 5, one (e.g., the first request output signal req1_i on the level "1" from the AND circuit 311) of them is selected by the priority determination circuit 313 so that the first acknowledge signal ack1 is asserted to the level "1". On the other hand, in each of the cycles 3 and 5 of FIG. 5, the other of them (the second request output signal req2_i on the level "1" from the AND circuit 312) is selected so that the second acknowledge signal ack2 is asserted to the level "1". As a result, the first shared region of the first local memory 101 is accessed in accordance with address signals C11 and C12 from the first processor 1 in each of the cycles 2 and 4, while the second shared region of the second local memory 201 is accessed in accordance with address signals C21 and C22 from the second processor 2 in each of the cycles 3 and 5.

It is assumed that the first request signal req1 on the first system bus 105 and the second request signal req2 on the second system bus 205 are simultaneously asserted to the level "1", while the first exclusive access request signal keep1 on the first system bus 105 and the second exclusive access request signal keep2 on the second system bus 205 are simultaneously asserted to the level "1", as shown in the cycle 6 of FIG. 5. Then, in accordance with the round robin method, the first request output signal req1_i on the level "1" from the AND circuit 311 is selected by the priority determination circuit 311 so that the first acknowledge signal ack1 is asserted to the level "1". Accordingly, an output of the AND circuit 302 is asserted to the level "1" and the data output Q of the first data latch circuit 304 is also asserted to the level "1" in the cycle 7. As a result, the first request mask signal reqmsk1 outputted from the AND circuit 305 is also asserted to the level "1" in the cycle 7 and the second request output signal req2_i from the AND circuit 312 is negated to a level "0". On the other hand, the assertion of the first request output signal req1_i from the AND circuit 311 to the level "1" is held. As a result, the first acknowledge signal ack1 is asserted to the level "1" and the second acknowledge signal ack2 is negated to the level "0" during a period T1 from the cycle 6 to the cycle 8, so that the first processor 1 exclusively accesses the shared resources. Consequently, the first shared region of the first local memory 101 is exclusively accessed in accordance with address signals C13, C14, and C15 from the first processor 1 during the period T1 from the cycle 6 to the cycle 8.

Next, when the first exclusive access request signal keep1 on the first system bus 105 is negated to the level "0", while the assertion of the second exclusive access request signal keep2 on the second system bus 205 to the level "1" is held, as shown in the cycle 9 of FIG. 5, the first request mask signal reqmsk1 outputted from the AND circuit 305 is negated to the level "0" and the second request mask reqmsk2 from the AND circuit 310 is asserted to the level "1". Accordingly, the first request output signal req1_i from the AND circuit 311 is negated to the "0" level in the cycle 10. As a result, the second acknowledge signal ack2 is asserted to the level "1" and the first acknowledge signal ack1 is negated to the level "0" during a period T2 from the cycle 9 to the cycle 11, so that the second processor 2 exclusively accesses the shared resources. Consequently, the first shared region of the first local memory 101 is exclusively accessed in accordance with address signals C23, C24, and C25 from the second processor 2 during the period T2 from the cycle 9 to the cycle 11.

Each of the third bus interface unit 4 and the fourth bus interface unit 7 as external interface units can be constructed to have the same internal structure as each of the first bus interface unit 3 shown in FIG. 3 and the second bus interface unit 5.

<Exclusive Access to Shared Resources Using Local Variable in Local Memory>

As shown in FIG. 1, a first local variable 101_LV for allowing the first processor 1 or the second processor 2 to exclusively access the shared resources in accordance with the spin lock method is stored in the first shared region of the first local memory 101. Likewise, a second local variable 201_LV for allowing the first processor 1 or the second processor 2 to exclusively access the shared resources in accordance with the spin lock method is stored in the second shared region of the second local memory 201. In the first local memory 101, the first local variable 101_LV is exclusively accessed by the first processor 1 or the second processor 2. Likewise, in the second local memory 201, the second local variable 201_LV is exclusively accessed by the first processor 1 or the second processor 2.

For example, a case is assumed in which the first processor 1 or the second processor 2 performs data transfer between the external peripheral device 702 as the shared resource and the shared memory 402 as the shared resource by using the direct memory access controller (DMAC) 6 as the shared resource. When these shared resources are usable, the first local variable 101_LV in the first local memory 101 is in a usable state ("0").

In the case where the first processor 1 uses these shared resources, the first processor 1 reads the value of the first local variable 101_LV stored in the first shared region of the first local memory 101. Since the read value is in the usable state ("0"), the first processor 1 determines that these shared resources are usable and starts using these shared resources. On starting the use of the shared resources, the first processor 1 exclusively accesses the first shared region of the first local memory 101 in response to the assertion of the first exclusive access request keep1 to the level "1" and thereby rewrites the value of the first local variable 101_LV to an in-use state ("1"). By rewriting the value of the first local variable 101_LV to the in-use state ("1"), the first processor 1 is allowed to perform data transfer between the external peripheral device 702 as the shared resource and the shared memory 402 as the shared resource by using the DMAC 6 as the shared resource. On ending the use of the shared resources, the first processor 1 rewrites the value of the first local variable 101_LV to the usable state ("0").

On starting the use of the shared resources, the second processor 2 exclusively accesses the first shared region of the first local memory 101 in response to the assertion of the second exclusive access request keep2 to the level "1" and thereby rewrites the value of the first local variable 101_LV to the in-use state ("1"). This allows the second processor 2 to use the DMAC 6, the external peripheral device 702, and the shared memory 402 as the shared resources. On ending the use of the shared resources, the second processor 2 rewrites the value of the first local variable 101_LV to the usable state ("0").

<Direct Memory Access Controller 6>

The direct memory access controller (DMAC) 6 transfers data from the shared region of the first local memory 101 or the second local memory 201 or from the shared memory 402 to the external peripheral device 702 or transfers data from the external peripheral device 702 to the shared region of the first local memory 101 or the second local memory 201 or to the shared memory 402 in accordance with an instruction from the first processor 1 or the second processor 2.

Figure 4:
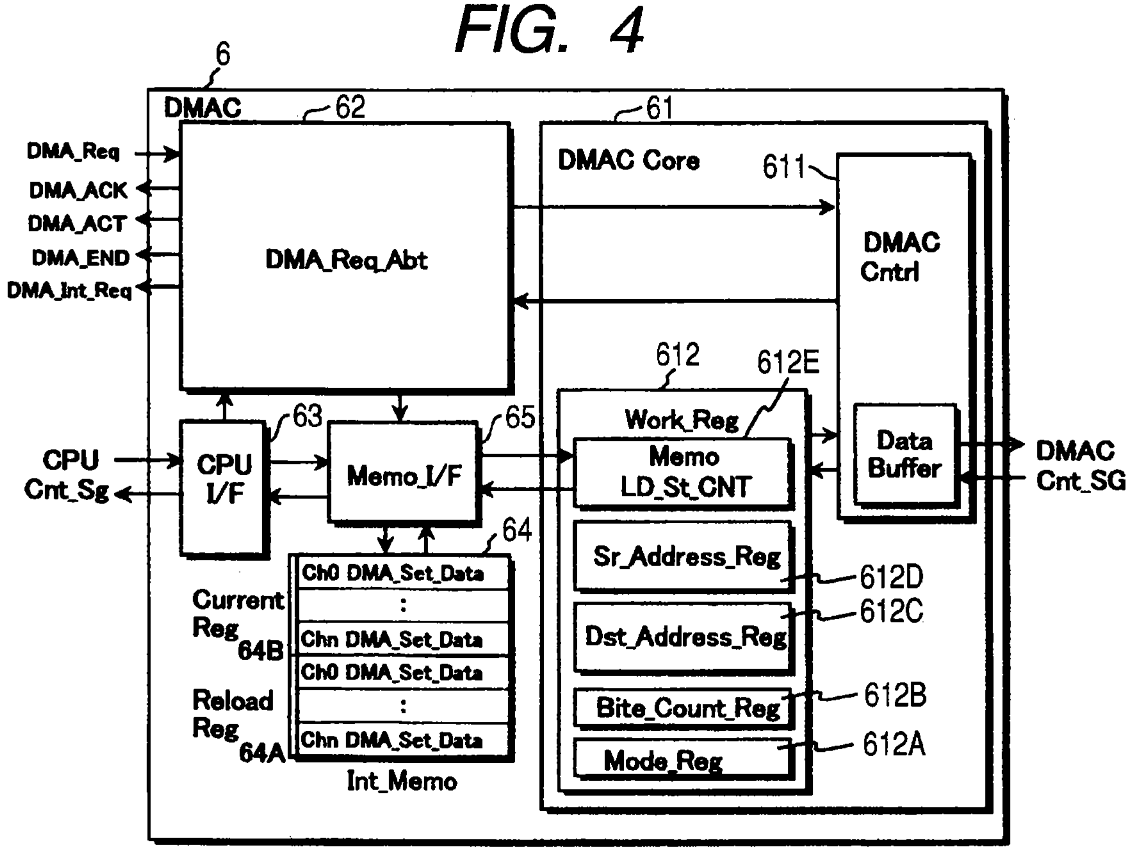
FIG. 4 is a view showing an internal structure of a direct memory access controller in the data processor chip of FIG. 1.

FIG. 4 is a view showing an internal structure of the DMAC 6 in the data processor chip of FIG. 1. As shown in the drawing, the DMAC 6 comprises: a DMAC core 61; a DMAC request arbitration unit 62; a CPU interface 63; an internal memory 64; and a memory interface 65. The DMAC core 61 receives data from the shared region of the first local memory 101 or the second local memory 201 or from the shared memory 402 and transfers the data to the external peripheral device 7 via an internal data buffer. The DMAC request arbitration unit 62 arbitrates between a plurality of DMA requests and generates a request signal to the DMAC core 61. The CPU interface 63 controls the read/write operation of register accesses from the first processor 1 or the second processor 2 to various registers in the DMAC 6. The internal memory 64 stores set information in the DMAC 6 and information to be transferred. The memory interface 65 controls a memory access from the first processor 1, the second processor 2, or the DMAC core 61 to the internal memory 64. The DMAC core 61 comprises: a DMAC control circuit 611 for controlling a DMA transfer; and a work register 612 including the various registers referenced by the DMAC control circuit 611. The work register 612 includes a mode register 612A for storing set mode information such as the number of DMA transfer bits and a data size, a byte counter 612B for storing set information such as the number of bytes to be DMA transferred, a destination address register 612C for storing the start address of a DMA transfer destination, a source address register 612D for storing the start address of a DMA transfer source, and a memory load/store control register 612E for controlling the load/store operation of data in the internal memory 64. The internal memory 64 includes a reload register 64A for a reloading function which enables a continuous transfer to a plurality of discretely arranged regions and a load register 64B for a loading function which does not use the reloading function.

An external request DMA_Req for a DMA transfer is supplied from the first processor 1 or the second processor 2 to the DMAC request arbitration unit 62 of the DMAC 6. A DMA acknowledge signal DMA_ACK, a DMA active signal DMA_ACT, a DMA end signal DMA_END, a DMA interrupt request signal DMA_Int_Req, and the like are supplied from the DMAC request arbitration unit 62 of the DMAC 6 to the first processor 1 or the second processor 2.

<Another Embodiment>

Figure 6:
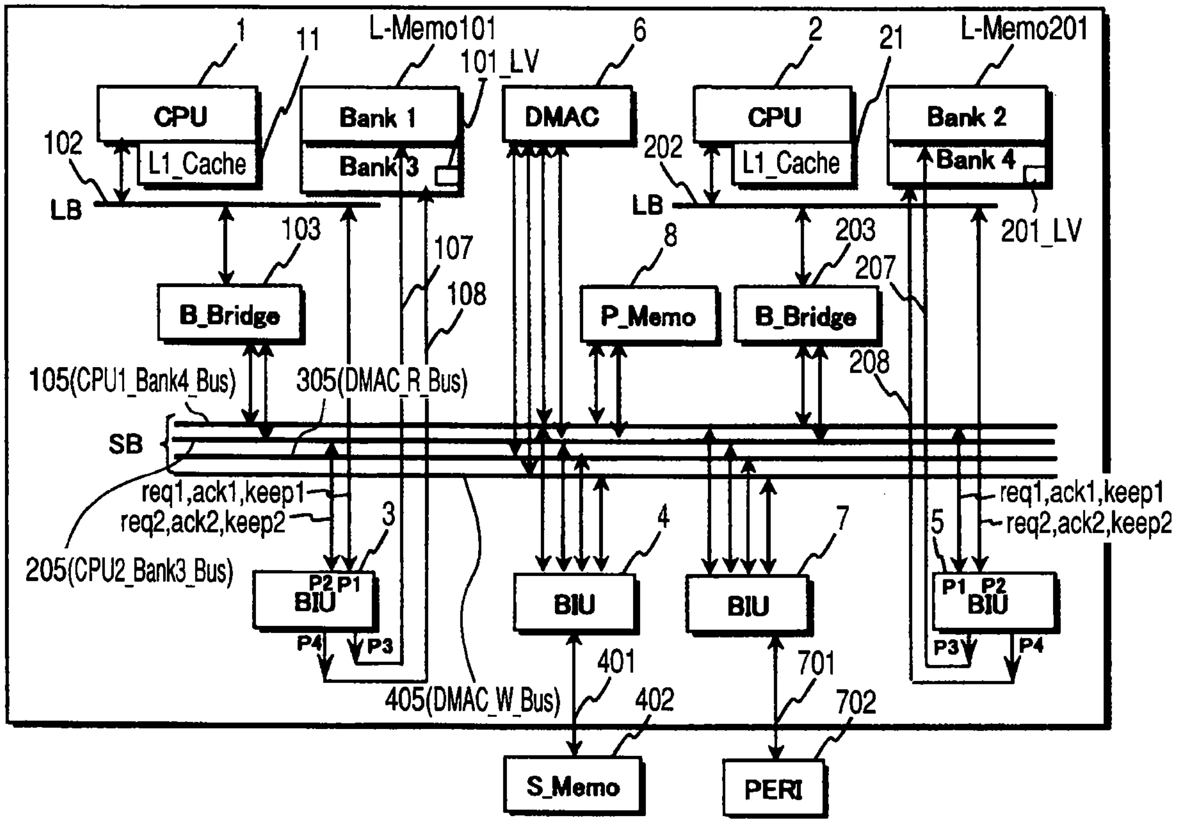
FIG. 6 is a view showing a data processing system in a multiprocessor architecture according to another embodiment of the present invention.

FIG. 6 is a view showing a data processing system in a multiprocessor architecture according to another embodiment of the present invention.

A description will be given herein below to the differences between the embodiment of FIG. 6 and the embodiment of FIG. 1.

In the embodiment of FIG. 1, the first local bus 102 and the first system bus 105 of the system bus SB are coupled via the first bus bridge 103, the first bus bridge 103 transmits information on the first local bus 102 to the first system bus 105 of the system bus SB, the second local bus 202 and the second system bus 205 of the system bus SB are coupled via the second bus bridge 203, the second bus bridge 203 transmits information on the second local bus 202 to the second system bus 205 of the system bus SB, the first port P1 and second port P2 of each of the first bus interface unit 3 and the second bus interface unit 5 are coupled to the first local memory 101 and the second local memory 201 via the first bus bridge 103 and the second bus bridge 203, and each of the first local bus 102 and the second local bus 202 is divided into the shared region and the unshared region, as shown in FIG. 2.

By contrast, in the embodiment of FIG. 6, the first port P1 of the first bus interface unit 3 is coupled directly to the first local bus 102, the second port P2 of the first bus interface unit 3 is coupled to the second local bus 202 via each of the second system bus 205 of the system bus SB and the second bus bridge 203, the second port P2 of the second bus interface unit 5 is coupled directly to the second local bus 202, the first port P1 of the second bus interface unit 5 is coupled to the first local bus 102 via each of the first system bus 105 of the system bus SB and the first bus bridge 103, and each of the first local memory 101 and the second local memory 201 may be either divided or undivided into the shared region and the unshared region. Accordingly, in the embodiment of FIG. 6, the first processor 1 can access the first local memory 101 via the first port P1 and third port P3 of the first bus interface unit 3, not via the first bus bridge 103, and the second processor 2 can access the second local memory 201 via the second port P2 and third port P3 of the second bus interface unit 5, not via the second bus bridge 203.

In addition, in the embodiment of FIG. 6, the first bus bridge 103 monitors access information on the first local bus 102 from the first processor 1 to the first local memory 101 or the second local memory 201, transmits the access information to the first system bus 105 or second system bus 205 of the system bus SB, while the second bus bridge 203 monitors access information on the second local bus 202 from the second processor 2 to the first local memory 101 or the second local memory 201 and transmits the access information to the first system bus 105 or second system bus 205 of the system bus SB. Each of the first local memory 101 and the second local memory 201 is divided into a plurality of memory banks or a plurality of memory pages. Each of the plurality of memory banks or the plurality of memory pages is specified by the upper bits of a first address signal from the first processor 1 and by the upper bits of a second address signal from the second processor 2. In FIG. 6, the first local memory 101 includes a first bank Bank1 and a third bank Bank3 and the second local memory 201 includes a second bank Bank2 and a fourth bank Bank4. The first bank Bank1 of the first local memory 101 is specified by the upper two bits "00" of the first address signal from the first processor 1 and the second bank Bank2 of the second local memory 201 is specified by the upper two bits "01" of the second address signal from the second processor 2. The third bank Bank3 of the first local memory 101 can be specified by the upper two bits "10" of the first address signal from the first processor 1 or of the second address signal from the second processor 2. The fourth bank Bank4 of the second local memory 201 can be specified by the upper two bits "11" of the first address signal from the first processor 1 or of the second address signal from the second processor 2.

Moreover, in the embodiment of FIG. 6, an access by the first processor 1 to the first bank Bank1 of the first local memory 101 and an access by the second processor 2 to the second bank Bank2 of the second local memory 201 can be executed in parallel. Each of the third bank Bank3 of the first local memory 101 and the fourth bank Bank4 of the second local memory 201 operates as the internal shared memory of the data processing system.

FIG. 7 is a view showing an example of bank division in each of the first local memory 101 and the second local memory 201 in the data processing system in a multiprocessor architecture of FIG. 6.

In the example of FIG. 7, the first bank Bank1 of the first local memory 101 specified by the upper two bits "00" of the processor address is used as an unshared region which can be accessed only by the first processor 1 via the first local bus 102 and the first bus interface unit 3, not via the first bus bridge 103 and the first system buts 105 and second system bus 205 of the system bus SB. The second bank Bank2 of the second local memory 201 specified by the upper two bits "01" of the processor address is also used as an unshared region which can be accessed only by the second processor 2 via the second local bus 202 and the second bus interface unit 5, not via the second bus bridge 203 and the first system bus 105 and second system bus 205 of the system bus SB. The third bank Bank3 of the first local memory 101 specified by the upper two bits "10" of the processor address is used as a shared region which can be accessed by each of the first processor 1 and the second processor 2 via the first bus bridge 103 or the second bus bridge 203, the second system bus 205 of the system bus SB, and the first bus interface unit 3. The fourth bank Bank4 of the second local memory 201 specified by the upper two bits "11" of the processor address is used as a shared region which can be accessed by each of the first processor 1 and the second processor 2 via the first bus bridge 103 or the second bus bridge 203, the first system bus 105 of the system bus SB, and the second bus interface unit 5.

The first bank Bank1 and third bank Bank3 of the first local memory 101 are coupled to the third port P3 and fourth port P4 of the first bus interface unit 3 via signal lines 107 and 108, respectively. The second bank Bank2 and fourth bank Bank4 of the second local memory 201 are coupled to the third port P3 and fourth port P4 of the second bus interface unit 5 via signal lines 207 and 208, respectively.

Further, in the embodiment of FIG. 6, an access from the second processor 2 to the second bank Bank2 of the second local memory via the second local bus 202 and the first port P1 and third port P3 of the second bus interface unit or an access from the second processor 2 to the fourth bank Bank4 of the second local memory via the second local bus 202, the second bus bridge 103, the first system bus 105 of the system bus SB, and the first port P1 and fourth port P4 of the second bus interface unit 5 can be performed in parallel with an access from the first processor 1 to the first bank Bank1 of the first local memory via the first local bus 102 and the first port P1 and third port P3 of the first bus interface or an access from the first processor 1 to the third bank Bank3 of the first local memory via the first local bus 102, the first bus bridge 103, the second system bus 205 of the system bus SB, and the second port P2 and fourth port P4 of the first bus interface unit 3.

Figure 8:
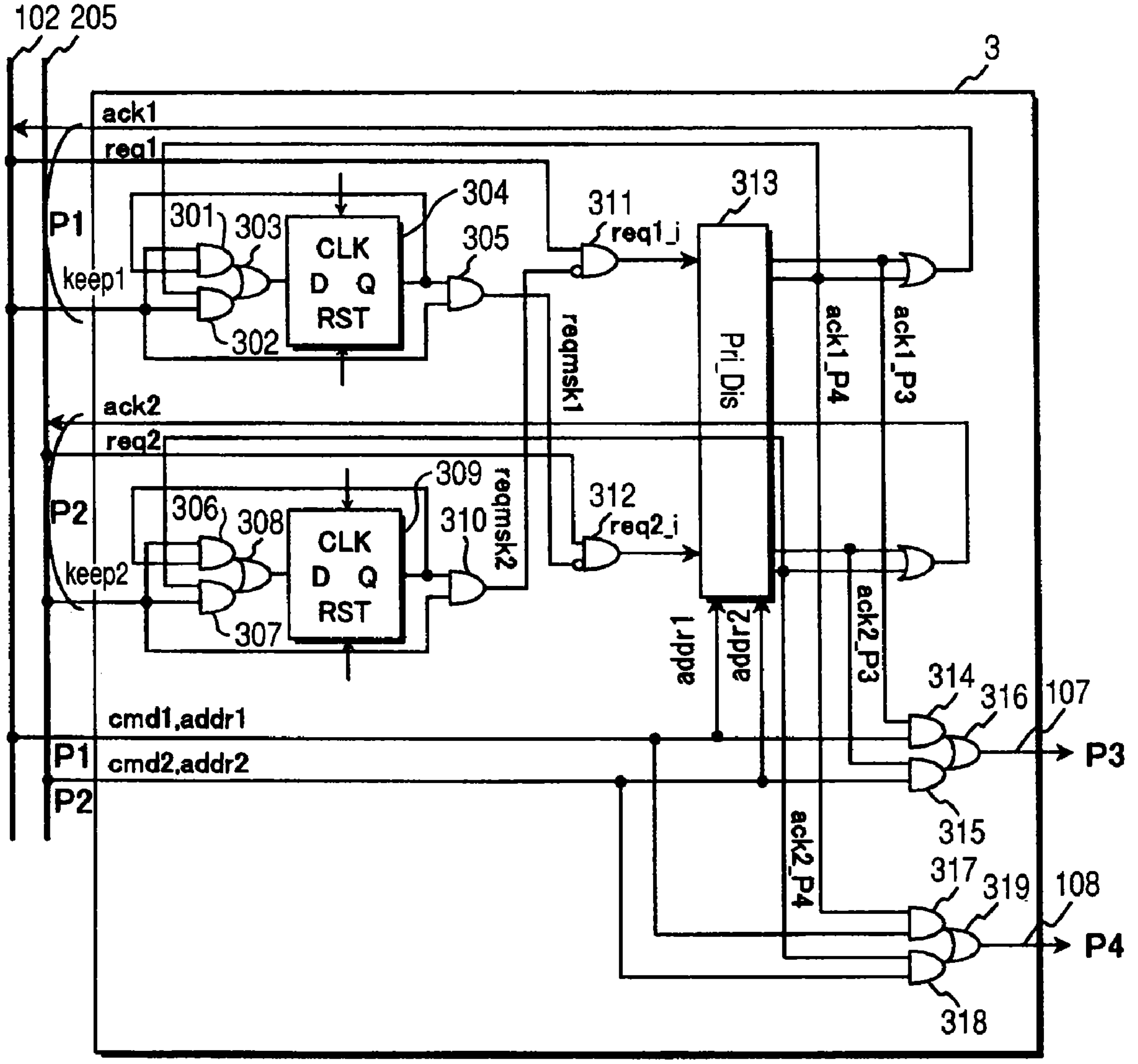
FIG. 8 is a view showing an internal structure of each of a first bus interface unit 3 and a second bus interface unit 5 in the data processor chip of FIG. 6.

FIG. 8 is a view showing an internal structure of each of the first bus interface unit 3 and the second bus interface unit 5 in the data processor chip of FIG. 6.

Although the drawing shows the internal structure of the first bus interface unit 3, the second bus interface unit 5 is also constructed in the same manner as the first bus interface unit 3.

FIG. 8 is different from FIG. 3 in that the upper two bits of the first address signal addr1 from the first processor 1, which is on the first local bus 102, and the upper two bits of the second address signal addr2 from the second processor 2, which is on the second system bus 205, are supplied to the priority determination circuit 313. As a result, as shown in FIG. 7, the first bank Bank1 and third bank Bank3 of the first local memory 101 and the second bank Bank2 and fourth bank Bank4 of the second local memory 201 can be accessed in accordance with the upper two bits of each of the processor addresses. Specifically, the first bank Bank1 as the unshared region of the first local memory 101 is selected with the upper two bits of the first address from the first processor 1 so that the first bank Bank1 as the unshared region of the first local memory 101 is accessed with the first address from the first processor 1, which is on the signal line 107 of the third port P3 of the first bus interface unit 3. The second bank Bank2 as the unshared region of the second local memory 201 is selected with the upper two bits of the second address from the second processor 2 so that the second bank Bank2 as the unshared region of the second local memory 201 is accessed with the second address from the second processor 2, which is on the signal line 207 of the third port P3 of the second bus interface unit 5. On the other hand, the third bank Bank3 as the shared region of the first local memory 101 is selected with the upper two bits of the first address from the first processor 1 or the second address from the second processor 2 so that the third bank Bank3 as the shared region of the first local memory 101 is accessed with the first address from the first processor 1 or the second address from the second processor 2, which is on the signal line 108 of the fourth port P4 of the first bus interface unit 3. The fourth bank Bank4 as the shared region of the second local memory 201 is selected with the upper two bits of the first address from the first processor 1 or the second address from the second processor 2 so that the fourth bank Bank4 as the shared region of the second local memory 201 is accessed with the first address from the first processor 1 or the second address from the second processor 2 on the signal line 208 of the fourth port P4 of the second bus interface unit 5.

In the embodiment of FIG. 6 also, an exclusive access can be performed by the first processor 1 or the second processor 2 to each of the third bank 3 of the first local memory 101 and the fourth bank Bank4 of the second local memory 201 which are the shared regions accessible by each of the first processor 1 and the second processor 2 provided that the first exclusive access request keep1 or the second exclusive access keep 2 is used. The first local variable 101_LV for allowing the first processor 1 or the second processor 2 to exclusively access the shared resources in the spin lock method is stored in the third bank Bank3 of the first local memory 101. The second 201_LV for allowing the first processor 1 or the second processor 2 to exclusively access the shared resources in the spin lock method is stored in the fourth bank Bank4 of the second local memory 201. By using the first exclusive access request keep1 or the second exclusive access request keep2, the first processor 1 or the second processor 2 is allowed to exclusively access the first local variable 101_LV stored in the third bank Bank3 of the first local memory 101. By using the first exclusive access request signal keep1 or the second exclusive access request signal keep 2, the first processor 1 or the second processor 2 is allowed to exclusively access the second local variable 201_LV stored in the fourth bank Bank4 of the second local memory 201.

Figure 9:
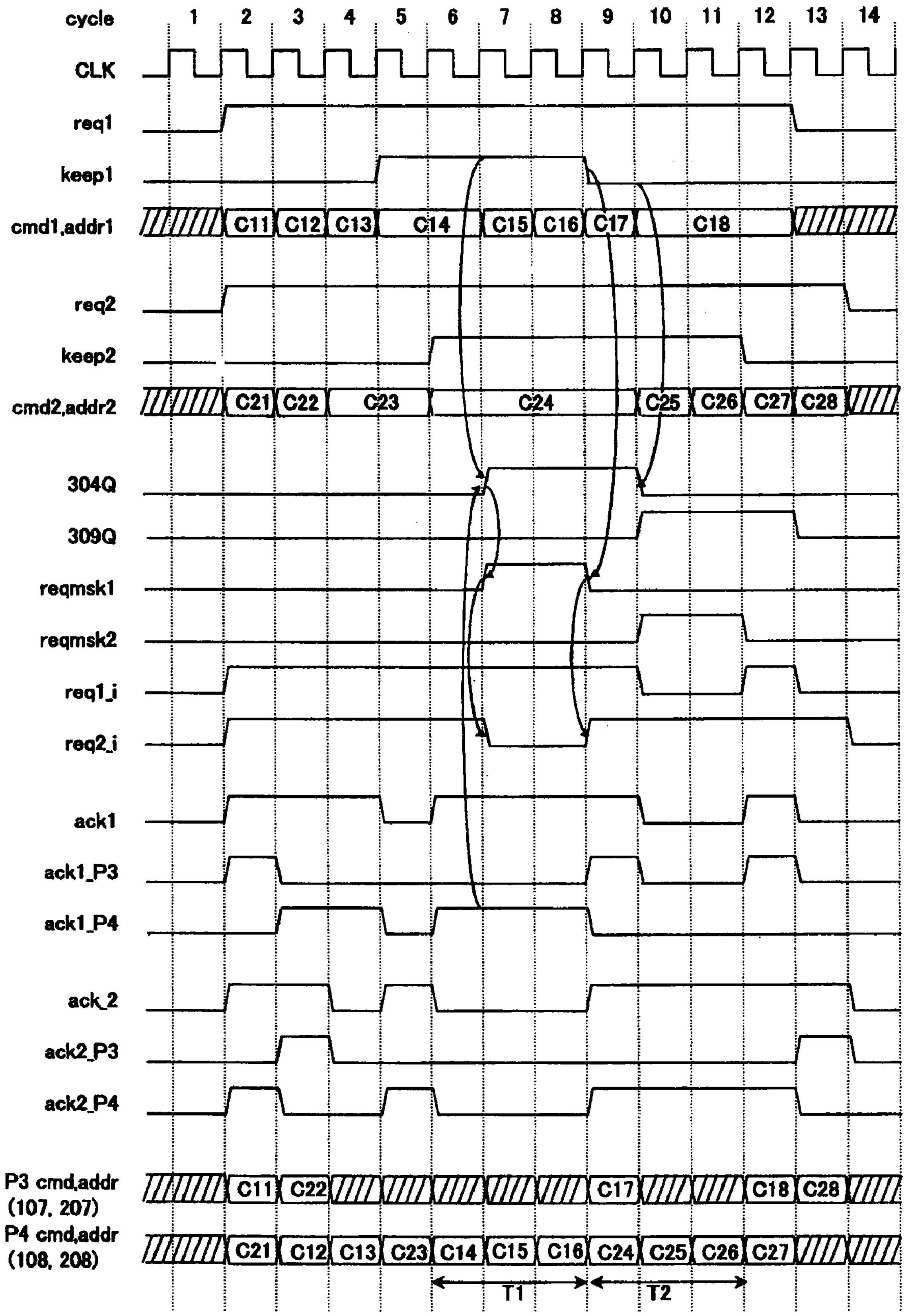
FIG. 9 is a waveform chart for each of the internal portions of the first bus interface unit 3, which is for illustrating the operation of each of the first bus interface unit and the second bus interface unit shown in FIG. 8.

FIG. 9 is a waveform chart for each of the internal components of the first bus interface unit 3, which is for illustrating the operation of each of the first bus interface unit 3 and the second bus interface unit 5 shown in FIG. 8.

The waveform chart of FIG. 9 is similar to the waveform chart of FIG. 5. However, in the cycle 2, the first bank Bank1 as the unshared region of the first local memory 101 is accessed in accordance with the address signal C11 from the first processor 1 obtained from the signal line 107 of the third port P3 of the first bus interface unit 3, while the fourth bank Bank4 as the shared region of the second local memory 201 is accessed in accordance with the address signal C21 from the second processor 2 obtained from the signal line 208 of the fourth port P4 of the second bus interface unit 5. In the cycle 3, the second bank Bank2 as the unshared region of the second local memory 201 is accessed in accordance with the address signal C22 from the second processor 2 obtained from the signal line 207 of the third port P3 of the second bus interface unit 5, while the third bank Bank3 as the shared region of the first local memory 101 is accessed in accordance with the address signal C12 from the first processor 1 obtained from the signal line 108 of the fourth port P4 of the first bus interface unit 3. In the cycle 4, the third bank Bank3 as the shared region of the first local memory 101 is accessed in accordance with the address signal C13 from the first processor 1 obtained from the signal line 108 of the fourth port P4 of the first bus interface unit 3. In the cycle 5, the fourth bank Bank4 as the shared region of the second local memory 201 is accessed with the address signal C23 from the second processor 2 obtained from the signal line 208 of the fourth port P4 of the second bus interface unit 5. During the period T1 from the cycle 6 to the cycle 8, the third bank Bank3 as the shared region of the first local memory 101 is exclusively accessed in accordance with the address signals C14 and C15 from the first processor 1 obtained from the signal line 108 of the fourth port P4 of the first bus interface unit 3. During the period T2 from the cycle 9 to the cycle 11, the fourth bank Bank4 as the shared region of the second local memory 201 is exclusively accessed in accordance with the address signals C24 and C25 and an address signal C26 each from the second processor obtained from the signal line 208 of the fourth port P4 of the second bus interface unit 5.

Although the invention achieved by the present inventors has thus been described specifically with reference to the embodiments thereof, the present invention is not limited thereto. It will be understood that various changes and modifications can be made in the invention without departing from the gist thereof.

For example, the number of the processors in the data processor chip may also be, e.g., 4 other than 2. It is also possible to apply the present invention to a super-parallel architecture in which an extremely large number of processors are coupled.

It will easily be appreciated that the present invention is applicable not only to a microcontroller and a microprocessor but also to LSIs in general each including a plurality of processors for high-speed processing of multimedia image data, such as a system LSI and a digital/analog mixed signal LSI used for various applications.

The present invention can be widely embodied in a multiprocessor architecture including a plurality of processors.

What claimed is:

1. A data processing system comprising:

a first processor;

a second processor;

a first local memory;

a second local memory;

a first local bus;

a second local bus;

a first bus bridge;

a second bus bridge;

a system bus including a first system bus and a second system bus;

a first bus interface unit; and a second bus interface unit, wherein the first local memory is coupled to the first processor via the first local bus, and the second local memory is coupled to the second processor via the second local bus, wherein the first bus bridge has one port coupled to the first local bus and the other port coupled to the first system bus, and the second bus bridge has one port coupled to the second local bus and the other port coupled to the second system bus, wherein the first bus interface unit has a first port coupled to the first system bus, a second port coupled to the second system bus, and a third port coupled to the first local memory, and the second bus interface unit has a first port coupled to the first system bus, a second port coupled to the second system bus, and a third port coupled to the second local memory, wherein when the first processor supplies a first request signal for requesting an access to the second local memory to the first port of the second bus interface unit via the first local bus, the first bus bridge, and the first system bus, the second bus interface unit receives the first request signal and gives a first acknowledge signal for permitting the access by the first processor to the second local memory and, in response to the first acknowledge signal, the first processor accesses the second local memory via the first local bus, the first bus bridge, the first system bus, and the first port and third port of the second bus interface unit, and, wherein when the second processor supplies a second request signal for requesting an access to the first local memory to the second port of the first bus interface unit via the second local bus, the second bus bridge, and the second system bus, the first bus interface unit receives the second request signal and gives a second acknowledge signal for permitting the access by the second processor to the first local memory and, in response to the second acknowledge signal, the second processor accesses the first local memory via the second local bus, the second bus bridge, the second system bus, and the second port and third port of the first bus interface unit.

2. A data processing system according to claim 1, wherein when the first processor supplies a first exclusive access request signal for requesting an exclusive access to the second local memory to the first port of the second bus interface unit via the first local bus, the first bus bridge, and the first system bus, the second bus interface unit receives the first exclusive access request signal and gives the first acknowledge signal for permitting the access by the first processor to the second local memory and, in response to the first acknowledge signal, the first processor exclusively accesses the second local memory via the first local bus, the first bus bridge, the first system bus, and the first port and third port of the second bus interface unit, and, wherein when the second processor supplies a second exclusive access request signal for requesting an exclusive access to the first local memory to the second port of the first bus interface unit via the second local bus, the second bus bridge, and the second system bus, the first bus interface unit receives the second exclusive access request signal and gives the second acknowledge signal for permitting the access by the second processor to the first local memory and, in response to the second acknowledge signal, the second processor exclusively accesses the first local memory via the second local bus, the second bus bridge, the second system bus, and the second port and third port of the first bus interface unit.

3. A data processing system according to claim 2, wherein a first local variable for allowing the first processor or the second processor to exclusively access shared resources in accordance with a spin lock method is stored in the first local memory, wherein a second local variable for allowing the first processor or the second processor to exclusively access the shared resources in accordance with the spin lock method is stored in the second local memory, wherein the first local variable in the first local memory is exclusively accessed by either of the first processor and the second processor, and wherein the second local variable in the second local memory is exclusively accessed by either of the first processor and the second processor.

4. A data processing system according to claim 3, further comprising:

external interface units capable of being coupled to external devices, wherein each of the external interface units is coupled to the first system bus and the second system bus, and wherein either of the first processor and the second processor exclusively accesses one of the external devices via the corresponding one of the external interface units by using either of the first local variable stored in the first local memory and the second local variable stored in the second local memory.

5. A data processing system according to claim 1, wherein the first local memory includes a first unshared region which can be accessed only by the first processor and a first shared region which can be accessed by each of the first processor and the second processor, and wherein the second local memory includes a second unshared region which can be accessed only by the second processor and a second shared region which can be accessed by each of the first processor and the second processor.

6. A data processing system according to claim 5, wherein an access by the first processor to the first unshared region of the first local memory and an access by the second processor to the second unshared region of the second local memory can be executed in parallel.

7. A data processing system according to claim 5, wherein each of the first shared region of the first local memory and the second shared region of the second local memory operates as an internal shared memory of the data processing system.

8. A data processing system according to claim 5, wherein the first unshared region of the first local memory, the first shared region of the first local memory, the second unshared region of the second local memory, and the second shared region of the second local memory are specified by respective address signals from the first processor and the second processor.

9. A data processing system comprising:

a first processor;

a second processor;

a first local memory;

a second local memory;

a first local bus;

a second local bus;

a first bus bridge;

a second bus bridge;

a system bus including a first system bus and a second system bus;

a first bus interface unit; and a second bus interface unit, wherein the first local bus is coupled to the first processor, and the second local bus is coupled to the second processor, wherein the first bus bridge is coupled between the first local bus and each of the first system bus and the second system bus, and the second bus bridge is coupled between the second local bus and each of the first system bus and the second system bus, wherein the first bus interface unit has a first port coupled to the first local bus, a second port coupled to the second system bus, and a third port coupled to the first local memory, and the second bus interface unit has a first port coupled to the second local bus, a second port coupled to the first system bus, and a third port coupled to the second local memory, wherein when the first processor supplies a first request signal for requesting an access to the first port of the first bus interface unit via the first local bus, the first bus interface unit receives the first request signal and gives a first acknowledge signal for permitting the access by the first processor and, in response to the first acknowledge signal, the first processor accesses the first local memory via the first local bus and the first port and third port of the first bus interface unit, wherein when the first processor supplies the first request signal for requesting the access to the first port of the second bus interface unit via the first local bus, the first bus bridge, and the first system bus, the second bus interface unit receives the first request signal and gives the first acknowledge signal for permitting the access by the first processor and, in response to the first acknowledge signal, the first processor accesses the second local memory via the first local bus, the first bus bridge, the first system bus, and the first port and third port of the second bus interface unit, wherein when the second processor supplies a second request signal for requesting an access to the second port of the second bus interface unit via the second local bus, the second bus interface unit receives the second request signal and gives a second acknowledge signal for permitting the access by the second processor and, in response to the second acknowledge signal, the second processor accesses the second local memory via the second local bus and the second port and third port of the second bus interface unit, and wherein when the second processor supplies the second request signal for requesting the access to the second port of the first bus interface unit via the second local bus, the second bus bridge, and the second system bus, the first bus interface unit receives the second request signal and gives the second acknowledge signal for permitting the access by the second processor and, in response to the second acknowledge signal, the second processor accesses the first local memory via the second local bus, the second bus bridge, the second system bus, and the second port and third port of the first bus interface unit.

10. A data processing system according to claim 9, wherein when the first processor supplies a first exclusive access request signal for requesting an exclusive access to the second local memory to the first port of the second bus interface unit via the first local bus, the first bus bridge, and the first system bus, the second bus interface unit receives the first exclusive access request signal and gives the first acknowledge signal for permitting the access by the first processor to the second local memory and, in response to the first acknowledge signal, the first processor exclusively accesses the second local memory via the first local bus, the first bus bridge, the first system bus, and the first port and third port of the second bus interface unit, and, wherein when the second processor supplies a second exclusive access request signal for requesting an exclusive access to the first local memory to the second port of the first bus interface unit via the second local bus, the second bus bridge, and the second system bus, the first bus interface unit receives the second exclusive access request signal and gives the second acknowledge signal for permitting the access by the second processor to the first local memory and, in response to the second acknowledge signal, the second processor exclusively accesses the first local memory via the second local bus, the second bus bridge, the second system bus, and the second port and third port of the first bus interface unit.

11. A data processing system according to claim 9, wherein a first local variable for allowing the first processor or the second processor to exclusively access shared resources in accordance with a spin lock method is stored in the first local memory, wherein a second local variable for allowing the first processor or the second processor to exclusively access the shared resources in accordance with the spin lock method is stored in the second local memory, wherein the first local variable in the first local memory is exclusively accessed by either of the first processor and the second processor, and wherein the second local variable in the second local memory is exclusively accessed by either of the first processor and the second processor.

12. A data processing system according to claim 11, further comprising:

external interface units capable of being coupled to external devices, wherein each of the external interface units is coupled to the first system bus and the second system bus, and wherein either of the first processor and the second processor exclusively accesses one of the external devices via the corresponding one of the external interface units by using either of the first local variable stored in the first local memory and the second local variable stored in the second local memory.

13. A data processing system according to claim 9, wherein the first local memory includes a first bank and a second bank, wherein the second local memory includes a third bank and a fourth bank, wherein the first bus interface unit has the first port coupled to the first local bus, the second port coupled to the second system bus, the third port coupled to the first bank of the first local memory, and a fourth port coupled to the second bank of the first local memory, and wherein the second bus interface unit has the first port coupled to the first system bus, the second port coupled to the second local bus, the third port coupled to the third bank of the second local memory, and a fourth port coupled to the fourth bank of the second local memory, wherein when the first processor supplies the first request signal for requesting the access to the first port of the first bus interface unit via the first local bus, the first bus interface unit receives the first request signal and gives the first acknowledge signal for permitting the access by the first processor and, in response to the first acknowledge signal, the first processor accesses the first bank of the first local memory via the first local bus and the first port and third port of the first bus interface unit, wherein when the first processor supplies the first request signal for requesting the access to the second port of the first bus interface unit via the first local bus, the first bus bridge, and the second system bus, the first bus interface unit receives the first request signal and gives the first acknowledge signal for permitting the access by the first processor and, in response to the first acknowledge signal, the first processor accesses the second bank of the first local memory via the first local bus, the first bus bridge, the second system bus, and the second port and fourth port of the first bus interface unit, wherein when the first processor supplies the first request signal for requesting the access to the first port of the second bus interface unit via the first local bus, the first bus bridge, and the first system bus, the second bus interface unit receives the first request signal and gives the first acknowledge signal for permitting the access by the first processor and, in response to the first acknowledge signal, the first processor accesses the fourth bank of the second local memory via the first local bus, the first bus bridge, the first system bus, and the first port and fourth port of the second bus interface unit, wherein when the second processor supplies the second request signal for requesting the access to the second port of the second bus interface unit via the second local bus, the second bus interface unit receives the second request signal and gives the second acknowledge signal for permitting the access by the second processor and, in response to the second acknowledge signal, the second processor accesses the third bank of the second local memory via the second local bus and the first port and third port of the second bus interface unit, wherein when the second processor supplies the second request signal for requesting the access to the second port of the first bus interface unit via the second local bus, the second bus bridge, and the second system bus, the first bus interface unit receives the second request signal and gives the second acknowledge signal for permitting the access by the second processor and, in response to the second acknowledge signal, the second processor accesses the second bank of the first local memory via the second local bus, the second bus bridge, the second system bus, and the second port and fourth port of the first bus interface unit, and, wherein when the second processor supplies the second request signal for requesting the access to the first port of the second bus interface unit via the second local bus, the second bus bridge, and the first system bus, the second bus interface unit receives the second request signal and gives the second acknowledge signal for permitting the access by the second processor and, in response to the second acknowledge signal, the second processor accesses the fourth bank of the second local memory via the second local bus, the second bus bridge, the first system bus, and the first port and fourth port of the second bus interface unit.

14. A data processing system according to claim 9, wherein the first local memory includes a first unshared region which can be accessed only by the first processor and a first shared region which can be accessed by each of the first processor and the second processor, and wherein the second local memory includes a second unshared region which can be accessed only by the second processor and a second shared region which can be accessed by each of the first processor and the second processor.

15. A data processing system according to claim 14, wherein an access by the first processor to the first unshared region of the first local memory and an access by the second processor to the second unshared region of the second local memory can be executed in parallel.

16. A data processing system according to claim 14, wherein each of the first shared region of the first local memory and the second shared region of the second local memory operates as an internal shared memory of the data processing system.

17. A data processing system according to claim 14, wherein the first unshared region of the first local memory, the first shared region of the first local memory, the second unshared region of the second local memory, and the second shared region of the second local memory are specified by respective address signals from the first processor and the second processor.

* * * * *